United States Patent
December et al.

(10) Patent No.: US 7,867,570 B2
(45) Date of Patent: Jan. 11, 2011

(54) METHOD OF PRODUCING A COATING HAVING METAL COORDINATING AND FILM-FORMING MATERIALS

(75) Inventors: Timothy S. December, Rochester Hills, MI (US); Sergio Gonzalez, Southfield, MI (US); Günther Ott, Münster (DE); Karl-Heinz Grosse-Brinkhaus, Nottuln (DE)

(73) Assignee: BASF Coatings GmbH, Muenster (DE)

( * ) Notice: Subject to any disclaimer, the term of this patent is extended or adjusted under 35 U.S.C. 154(b) by 358 days.

(21) Appl. No.: 11/553,213

(22) Filed: Oct. 26, 2006

(65) Prior Publication Data
US 2008/0102214 A1 May 1, 2008

(51) Int. Cl.
*B05D 3/02* (2006.01)
(52) U.S. Cl. ............. 427/385.5; 427/386; 427/384
(58) Field of Classification Search .......... 427/384, 427/385.5, 386
See application file for complete search history.

(56) References Cited

U.S. PATENT DOCUMENTS

| | | | |
|---|---|---|---|
| 3,179,623 A * | 4/1965 | Bowen .......... 528/205 |
| 4,761,337 A | 8/1988 | Guagliardo et al. |
| 5,342,901 A | 8/1994 | Kogure et al. |
| 5,554,700 A | 9/1996 | Schipfer et al. |
| 5,670,441 A | 9/1997 | Foedde et al. |
| 5,817,733 A | 10/1998 | Rink |
| 5,908,912 A | 6/1999 | Kollah et al. |
| 5,972,189 A | 10/1999 | McMurdie et al. |
| 6,025,438 A | 2/2000 | Hinterwaldner et al. |
| 6,174,422 B1 | 1/2001 | Hönig et al. |
| 6,190,524 B1 | 2/2001 | Kollah et al. |
| 6,265,079 B1 | 7/2001 | Nishiguchi et al. |
| 6,333,367 B1 | 12/2001 | Kato et al. |
| 6,353,057 B1 | 3/2002 | He et al. |
| 6,436,201 B1 | 8/2002 | Sugita et al. |
| 6,617,030 B2 | 9/2003 | Morishita et al. |
| 6,624,215 B1 | 9/2003 | Hiraki et al. |
| 6,852,824 B2 | 2/2005 | Schwarte et al. |

FOREIGN PATENT DOCUMENTS

DE 44 08 865 A1 9/1995

(Continued)

OTHER PUBLICATIONS

Pham et al. "Epoxy Resins" in Kirk-Othmer Encyclopedia of Chemical Technology, copyright 2004 by John Wley & Sons.*

(Continued)

*Primary Examiner*—Michael Barr
*Assistant Examiner*—Robert S Walters, Jr.
(74) *Attorney, Agent, or Firm*—Harness, Dickey & Pierce, P.L.C.

(57) ABSTRACT

Film-forming materials include nonionic metal coordinating structures. Nonionic metal coordinating structures can coordinate metals, such as metal catalysts and metal substrates. Example film-forming materials can be the product of a polyfunctional epoxide and a nucleophilic ligand having a nonionic metal coordinating structure, or the product of a polyfunctional alcohol and an electrophilic ligand having a nonionic metal coordinating structure. Coating compositions can include the film-forming material and a crosslinker. The coating compositions can be used to coat a substrate, such as a metal substrate. Applied coating layers on substrates can be cured to form coating films.

25 Claims, 1 Drawing Sheet

FOREIGN PATENT DOCUMENTS

Figure 1:
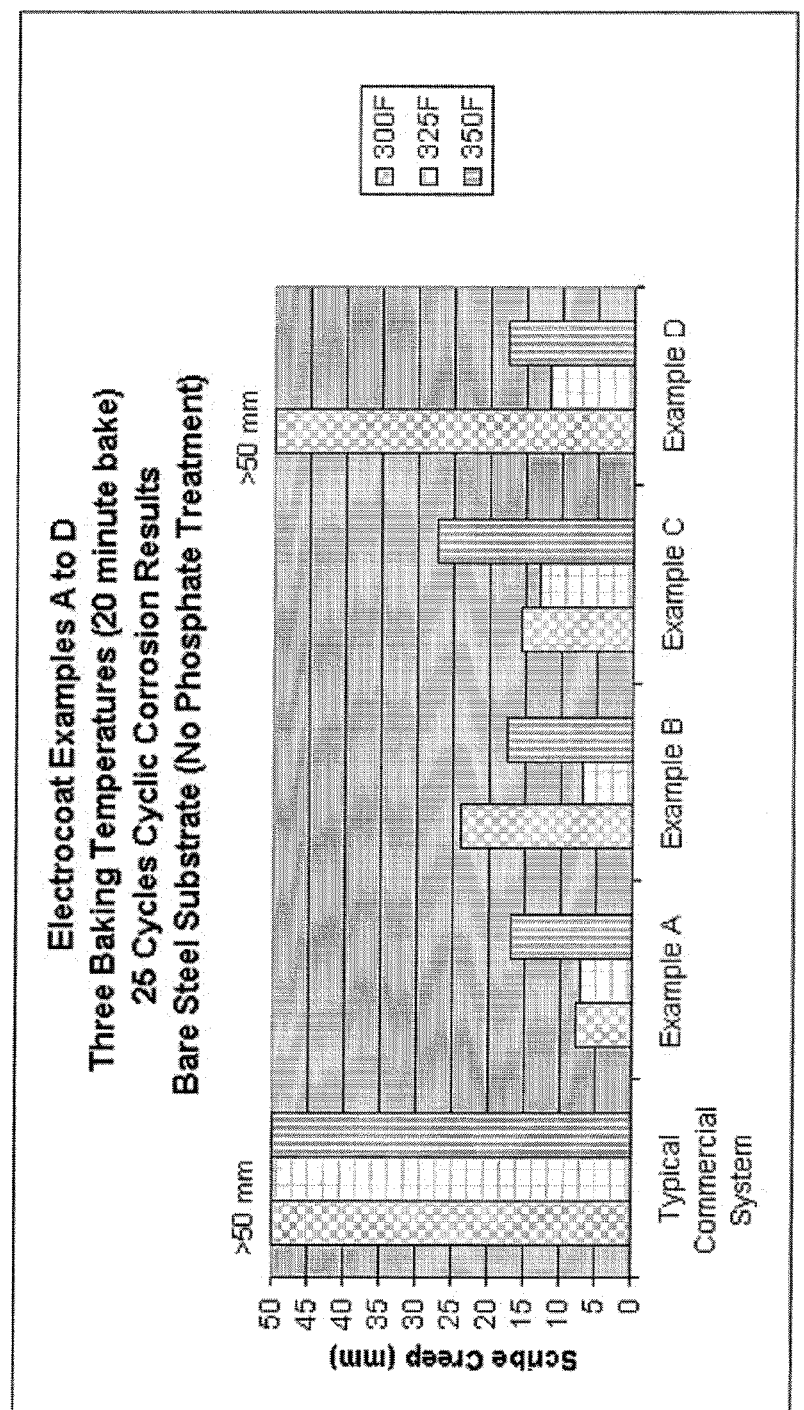

| | | |
|---|---|---|
| DE | 102004045844 A1 | 3/2006 |
| EP | 0 304 834 A2 | 3/1989 |
| EP | 0680988 A2 | 11/1995 |
| JP | 56 062830 | 5/1981 |
| JP | 08-060382 * | 3/1996 |
| WO | WO 00/47642 | 8/2000 |
| WO | WO2007/117900 A2 | 10/2007 |

OTHER PUBLICATIONS

Kaliyappan, T. et al., "Co-ordination polymers," Progress in Polymer Science, 25 (2000) 343-370.

Kaliyappan, T. et al., "Synthesis and characterization of a new metal chelating polymer and derived Ni (II) and Cu (II) polymer complexes," Polymer, Elsevier Science Publishers, B.V., GB, vol. 37, No. 13, pp. 2865-2869, 1996.

Singh A. et al., "Towards achieving selectivity in metal ion binding by fixing ligand-chelator complex geometry in polymers," Reactive & Functional Polymers, 44 (2000) 79-89.

Tang et al., "The coiled coils in the design of protein-based constructs: hybrid hydrogels and epitope displays," Journal of Controlled Release 72 57-50 (2001).

Yang, Li Qun et al., "Studies on Coordination-Crosslinking of Soap-Free Polyacrylate Hydrosol and Metal Ion," J. Appl. Polym. Sci., Dec. 26, 1997, John Wiley & Sons Inc., New York, NY vol. 66, No. 13, pp. 2457-2463, XP002474955.

* cited by examiner

METHOD OF PRODUCING A COATING HAVING METAL COORDINATING AND FILM-FORMING MATERIALS

BACKGROUND

Coating compositions are used in a variety of applications to coat a variety of substrates, often for protection of the substrate or to improve adhesion of subsequent coating layers. Typical coatings include electrodeposition coatings, primers, sealers, basecoats, clearcoats, and one-coat topcoats. Coating compositions include film-forming materials containing one or more resins, which may be polymeric, oligomeric, and/or monomeric materials, that are applied to a substrate by various methods, including electrodeposition (or electrocoating), spray coating, dip coating, roll coating, knife coating, and curtain coating. As used herein, a "resin" refers to one or more polymeric, oligomeric, and/or monomeric materials; a polymer includes repeating monomer units; an oligomer includes a few repeating monomer units, typically ten or fewer. Various types of film-forming materials are known, including epoxy, acrylic, polyurethane, polycarbonate, polysiloxane, aminoplast, and polyester resins.

Coating compositions can include a pigment dispersing or grind resin and a principal resin that generally constitutes the major polymeric part of the coating film. A grind resin usually includes a film-forming material, with which a pigment paste is made by wetting out pigment, filler, and catalyst, such as a metal catalyst, where the grind resin is blended or mixed with the other materials by milling in, e.g., a sandmill, ball mill, attritor, or other equipment. The pigment paste is combined with the principal resin and, typically, a curing agent. The grind resin and the principal resin can include the same, different, or mixtures of various film-forming materials.

The relatively soft film of an applied coating composition can be hardened by curing or crosslinking the film through incorporation of a crosslinker or curing agent in the coating composition. The crosslinker can be chemically reactive toward the polymers, oligomers, and/or monomeric compounds of the resin in the coating composition, thereby covalently joining the film-forming units together into a crosslinked film. Typical crosslinkers are activated (e.g., unblocked) using heat during a curing step and/or by exposure to actinic radiation. Catalysts, such as metal catalysts, can be used to facilitate thermal activation of the crosslinker and the reaction of the crosslinker with the resin. For example, inclusion of a catalyst such as a metal catalyst can reduce the requisite cure temperature and/or provide for a more complete cure.

Coating compositions can be powder, organic solvent based, or aqueous based. However, it is often desirable to use aqueous based coatings in order to reduce organic emissions. Such aqueous coating compositions include emulsions and dispersions of cationic, anionic, or nonionic resins, which may be formed via the dispersive properties of the resins themselves or with aid of external surfactants.

Epoxy-based coatings include polymers, oligomers, and/or monomers prepared by reacting materials with epoxide groups with materials having functional groups such as carboxyl, hydroxyl, and amine groups. Epoxies can be cured or crosslinked to form hardened coatings by using various crosslinkers depending on the functional groups present. For example, hydroxy-functional resin can be cured using isocyanate compounds. Such coating compositions are known in the art; e.g., U.S. Pat. Nos. 6,852,824; 5,817,733; and 4,761,337.

The electrodeposition process can be anodic or cathodic; typically the article to be coated serves as the cathode. Electrodeposition processes are advantageous both economically and environmentally due to the high transfer efficiency of coating resin to the substrate and the low levels of organic solvent, if any, that are employed. Another advantage of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even and continuous coating layer formed over all portions of the metallic substrate provides maximum anticorrosion effectiveness.

Electrocoat baths can comprise an aqueous dispersion or emulsion of a film-forming material, such as an epoxy resin, having ionic stabilization. A dispersion is typically a two-phase system of one or more finely divided solids, liquids, or combinations thereof in a continuous liquid medium such as water or a mixture of water and organic cosolvent. An emulsion is a dispersion of liquid droplets in a liquid medium, preferably water or a mixture of water and various cosolvents. Accordingly, an emulsion is a type of dispersion.

For automotive or industrial applications, the electrocoat compositions are formulated to be curable compositions by including a crosslinker. During electrodeposition, a coating composition containing an ionically-charged resin is deposited onto a conductive substrate by submerging the substrate in an electrocoat bath having dispersed therein the charged resin and then applying an electrical potential between the substrate and a pole of opposite charge, for example, a stainless steel electrode. The charged coating particles are plated or deposited onto the conductive substrate. The coated substrate is then heated to cure the coating.

It is desirable to increase the performance of coating compositions. Particularly, for many applications, improvement in the adhesive strength of the cured coating film would be beneficial. Furthermore, reducing the cure temperature for crosslinking the coating film would simplify the coating process by reducing the energy and expense required. Moreover, lower cure temperatures would be advantageous for applying coatings to thermally-sensitive substrate materials. Finally, any simplification in the synthesis and preparation of coating compositions that reduces time and expense would provide further advantages.

A need, therefore, exists for coating compositions that have better substrate adhesion, reduced cure temperatures, and that are simpler to produce.

SUMMARY

The present disclosure provides in one embodiment a film-forming material comprising a resin, wherein the resin includes at least one pendent group comprising a nonionic metal coordinating structure and at least one crosslinkable group. The crosslinkable group can be reactive with a crosslinker, self condensing, reactive with another group on the resin, or addition polymerizable. The resin can be any film-forming resin, such as an epoxy, acrylic, polyurethane, polycarbonate, polysiloxane, aminoplast, or polyester resin and can be a homopolymer or copolymer.

In certain embodiments, the pendent group comprising a nonionic metal coordinating structure can be bonded to the resin via an ether linkage. The group reactive with a crosslinker can be an epoxide, hydroxyl, carboxyl, carbamate, or amine group.

In various embodiments, the nonionic metal coordinating structure comprises a first electron-rich group. The first electron-rich group can include an atom such as nitrogen, oxygen, phosphorous, sulfur, silicon, and carbon and can include groups such as ester, ketone, ether, unsaturated carbon, and hydroxyl groups. The nonionic metal coordinating structure can further include a second electron-rich functional group that is in an alpha- or beta-position relative to the first electron-rich functional group. The nonionic metal coordinating structure in the film-forming material can coordinate a metal atom of materials including metals and metal compounds, such as metal substrates and metal catalysts.

In some embodiments, a crosslinker for polymerizing a film-forming material comprises an organic compound, such as an alkyl or aromatic compound, comprising at least two functional groups reactive with a film-forming resin and at least one pendent group comprising a nonionic metal coordinating structure.

Embodiments further include methods of producing curable film-forming materials and film-forming materials produced by reacting resins and ligands having a nonionic metal coordinating structure. For example, film-forming materials can be the product of a reaction between a resin, wherein the resin has at least one group reactive with a nucleophile, and a nucleophilic ligand. Film-forming materials can also be the product of a reaction of a resin, wherein the resin has at least one group reactive with an electrophile, and an electrophilic ligand.

In various other embodiments, methods of producing a coated substrate are provided. Methods of producing a coated substrate include preparing a coating composition comprising a crosslinker and a film-forming material, wherein one of the crosslinker and the film-forming material comprises a nonionic metal coordinating structure; and applying the coating composition to the substrate.

Some embodiments of the present disclosure include methods of producing coating compositions. Coating compositions include a film-forming material having a pendent nonionic metal coordinating structure and a crosslinkable group. The film-forming material may be formed by a reaction mixture comprising a resin and a ligand having a nonionic metal coordinating structure. When the film-forming material is not self-crosslinking, the coating composition can include a crosslinker that is combined with the film-forming material to produce a coating composition. Various embodiments include coating compositions that further comprise forming an ionizable group on the film-forming material. Also disclosed are methods and coating compositions for electrodeposition.

In other embodiments, methods of producing a coated substrate are provided. A coating composition is prepared comprising a crosslinkable film-forming material with a ligand having a nonionic metal coordinating structure and a crosslinker. The coating composition can be applied to a substrate. In some embodiments, application of the coating composition to an electrically conductive substrate is by electrodeposition. The applied coating is cured.

The present disclosure affords various benefits including the addition of nonionic metal coordinating groups into the resin and/or incorporation of nonionic metal coordinating groups into the crosslinker. The technology described herein provides incorporating nonionic metal coordinating ligands at one or more sites along the polymeric backbone of a resin and/or incorporating metal coordinating groups at one or plural terminal positions on a resin, thereby forming a film-forming material comprising groups that coordinate metals and metal compounds. This process can provide a coating composition that has a film-forming material that presents metal coordinating sites to interact with metals or metal-containing compounds.

The film-forming materials of the present disclosure provide an advantage in that the film-forming materials can coordinate metal catalysts to reduce the requisite cure temperature of the coating composition and/or provide for more complete curing. For example, embodiments of the present disclosure enable liquid organo-metallic salts to be added directly to the aqueous coating composition to form resin and metal catalyst complexes so that metal catalysts or organo-metallics, such as metal carboxylate complexes, do not have to be added to the electrodeposition bath. Metal compounds added to the electrodeposition bath can present compatibility issues with the coating formulation and potentially lead to coating defects, for example, due to hydrolysis of metal carboxylates. Or, in the case of metal oxide catalysts, the present process has advantages since it obviates a need to incorporate metal oxides into a coating composition via a grinding process.

Another advantage of the present film-forming materials is that the metal coordinating structures employed are nonionic metal coordinating structures. Consequently, aqueous electrodepositable coating compositions formed using the film-forming materials of the present disclosure have reduced or substantially no compatibility issues with salting agents. Conversely, resins having ionic metal coordinating groups can compromise the effectiveness of salting agents in forming an electrocoating composition, and the salting agents can in turn compromise the coordination of the metal catalysts.

The film-forming materials of the present invention can also provide better adhesion to and protection of a metal substrate. Without wishing to be bound by theory, it is believed that the nonionic metal coordinating structures in the film-forming materials can interact with the metal substrate surface to enhance adhesion of the polymeric film thereto. Furthermore, coating compositions according to the present disclosure can be formulated such that some of the metal coordinating structures are complexed with metal catalysts to enhance curing, while other metal coordinating structures are free to interact with the metal substrate to enhance adhesion.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

DRAWINGS

The drawings described herein are for illustration purposes only and are not intended to limit the scope of the present disclosure in any way.

FIG. 1 is a graphical representation of scribe creep from Corrosion Tests using metal substrates coated with exemplary coating compositions including metal coordinating and film-forming materials constructed in accordance with the present teachings.

DETAILED DESCRIPTION

Further areas of applicability and advantages will become apparent from the following description. It should be understood that the description and specific examples, while exemplifying various embodiments of the invention, are intended for purposes of illustration and are not intended to limit the scope of the invention.

In a first embodiment, a film-forming material can comprise a crosslinkable resin, wherein the resin includes at least one pendent group comprising a nonionic metal coordinating structure and a crosslinkable functionality selected from at least one group reactive with a crosslinker, at least one self-condensing group, and at least one group curable with actinic radiation. The film-forming material can be prepared by reacting a resin, wherein the resin has at least one group reactive with a nucleophile, and a nucleophilic ligand; or, by reacting a resin, wherein the resin has at least one group reactive with an electrophile, and an electrophilic ligand The nucleophilic ligand and the electrophilic ligand each include a metal coordinating structure. Coating compositions include the film-forming materials described in this disclosure, methods of coating substrates include application of coating compositions having these film-forming materials, and coated substrates have coatings prepared from such coating compositions.

In one embodiment, the film-forming material comprises a resin that includes at least one pendent group comprising a nonionic metal coordinating structure and at least one group reactive with a crosslinker. The resin can include one or more polymeric, oligomeric, and/or monomeric materials. The film-forming material can include various resins, such as epoxy, acrylic, polyurethane, polycarbonate, polysiloxane, polyvinyl, polyether, aminoplast, and polyester resins, and can include mixtures thereof. In these embodiments where the resin is a polymer, it can be a homopolymer or a copolymer. Copolymers have two or more types of repeating units.

In some embodiments, the pendent group comprising a nonionic metal coordinating structure is bonded to the resin via various linkages resulting from the reaction of various functional groups. These various linkages include ester, amine, urethane, and ether bonds, among others. Exemplary reactions of functional groups to produce these linkages include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage; and other types of linkages generally used in forming coating resins. The at least one group reactive with a crosslinker can be an epoxide, hydroxyl, carboxyl, or amine group.

In some embodiments, a film-forming material comprises an epoxy resin comprising the formula:

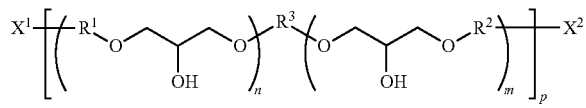

wherein, $X^1$ and $X^2$ are independently hydrogen, hydroxyl, epoxide, or amine functional monovalent radicals; each $R^1$ and $R^2$ is independently alkylene or arylene divalent radicals; $R^3$ is an alkylene or arylene divalent radical comprising a nonionic metal coordinating structure; n is a number from 1 to about 12; m is a number from 0 to about 12; and p is a number from 1 to about 12.

In some embodiments, the alkyl or aromatic divalent radicals denoted by $R^1$ and $R^2$ can be 2,2-diphenylpropylene divalent radicals. Exemplary $R^3$ alkylene or arylene divalent radicals comprising a nonionic metal coordinating structure include divalent radicals (where two bonded hydrogen atoms are removed) of ethyl 2-hydroxybenzoate, 4-hydroxy-1-(4-hydroxyphenyl)pentan-2-one, and 1-(2-hydroxy-6-methoxyphenyl)ethanone.

Furthermore, in cases where n>1 and/or m>1, two or more 2,2-diphenylpropylene radicals can be covalently bonded to each other. For example, in some embodiments where n and/or m>1, $R^1$ and $R^2$ of the resin can comprise part of the product formed by the reaction of diglycidyl ether of bisphenol A ("G") and bisphenol A ("B"), which results in repeats of the formula -G-B-. Embodiments further include permutations wherein n and/or m is a number from 1 to about 12, that result in repeating units such as -G-B-G-, -G-B-G-B-, -G-B-G-B-G-, and so on.

In some embodiments, $X^1$ and $X^2$ are independently hydrogen, hydroxyl, epoxide, or amine functional monovalent radicals. Embodiments of resins where $X^1$ and/or $X^2$ are amine monovalent radicals can include epoxy resins capped with an amine, for example, by reacting an amine-containing compound with an epoxide group. Exemplary capping compounds can include ammonia or amines such as dimethylethanolamine, aminomethylpropanol, methylethanolamine, diethanolamine, diethylethanolamine, dimethylaminopropylamine, the diketamine derivative of diethylenetriamine, and mixtures thereof. A cathodic electrocoating composition is formed by salting the resin and dispersing it in water.

It should be noted that in some embodiments, such as for example, liquid epoxy coating compositions, the overall molecular weight of the film-forming material will affect the liquid phase properties, such as the viscosity of the coating composition. Consequently, the molecular weight (and corresponding viscosity) of the resin can be adjusted as required by changing the number of repeating portions in the resin by varying the values of n, m, and p in the above formula. For example, film-forming materials can include from one to about twelve units denoted by both n and p and from zero to about twelve units denoted by m.

In some embodiments, the resin is an acrylic polymer, which can be prepared from monomers such as methyl acrylate, acrylic acid, methacrylic acid, methyl methacrylate, butyl methacrylate, cyclohexyl methacrylate, and the like. The acrylic polymer comprises a functional group which is a hydroxyl, amino or epoxy group that is reactive with a curing agent (i.e., crosslinker). The functional group can be incorporated into the ester portion of the acrylic monomer. For example, hydroxyl-functional acrylic copolymers may be formed by polymerization using various acrylate and methacrylate monomers, including but not limited to, hydroxyethyl acrylate, hydroxybutyl acrylate, hydroxybutyl methacrylate, or hydroxypropyl acrylate; amino-functional acrylic copolymers by polymerization with t-butylaminoethyl methacrylate and t-butylaminoethylacrylate; and epoxy-functional acrylic copolymers by reaction with glycidyl acrylate, glycidyl methacrylate, or allyl glycidyl ether.

Other ethylenically unsaturated monomers that may be used in forming the acrylic copolymer having reactive functionality include esters or nitriles or amides of alpha-, beta-ethylenically unsaturated monocarboxylic acids containing 3 to 5 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, including those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, α-methyl styrene, vinyl toluene, and 2-vinyl pyrrolidone.

Acrylic copolymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process. Where the reaction is carried out in a solution polymerization process, the solvent should preferably be removed after the polymerization is completed. Preferably, the polymerization is carried out in the absence of any solvent.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a solid acrylic copolymer.

Acrylic resins can have a hydroxyl value of 20 to 120, preferably between 50 and 100, and a number average molecular weight of 3,000 to 35,000, preferably between 10,000 and 20,000. A typical acrylic polymer is a hydroxy functional acrylic polyol. In some embodiments, an acrylic resin can be used to form an electrocoating composition. A cathodic electrocoating composition may be formed by copolymerizing an amine-functional ethyleneically unsaturated monomer. The amine is salted and dispersed in water.

In some embodiments, the resin is a polyester resin. Polyfunctional acid or anhydride compounds can be reacted with polyfunctional alcohols to form the polyester, and include alkyl, alkylene, aralkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid.

Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least 2. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is typically removed from the polyester product before the coating formulation is begun.

In some embodiments, the resin can be a polyurethane resin. Polyurethanes can be formed from two components, where the first includes compounds containing isocyanate-reactive groups, preferably hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. These compounds generally have a molecular weight of from about 60 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred macromonomer compounds containing isocyanate-reactive hydrogen atoms are the known polyester polyols, polyether polyols, polyhydroxy polyacrylates and polycarbonates containing hydroxyl groups. In addition to these polyhydroxyl compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

The film-forming material according to the first embodiment includes a nonionic metal coordinating structure. A nonionic metal coordinating structure can include aromatic and/or alkyl groups and can include an atom or group of atoms that is electron-rich but without a net electric charge (i.e., nonionic). For example, the nonionic metal coordinating structure can include one or more atoms or groups of atoms that have high electron density and comprise electron-rich functional groups. Exemplary electron-rich functional groups can include one or more of the following: nitrogen atoms, oxygen atoms, phosphorous atoms, sulfur atoms, silicon atoms, and carbon atoms having unsaturated bonds; esters; ketones; ethers; hydroxyls; carboxylates; alcoholic ketones; and cyclic esters. Other exemplary nonionic metal coordinating structures can include two electron-rich functional groups, one in an alpha- or beta-position relative to the other, selected from hydroxyls, carbonyls, esters, ethers, and combinations thereof. An exemplary nonionic metal coordinating structure having two electron-rich functional groups includes beta-hydroxy esters.

In some embodiments, the film-forming material further comprises one or more metals or metal containing compounds that are coordinated by the nonionic metal coordinating structure. Film-forming materials can therefore coordinate one or more metals, including metal catalysts that improve the cure response of the film-forming material when used in a coating composition. Metal materials can include those selected from a group consisting of M, MO, $M_2O_3$, $M(OH)_n$, $R_xMO$, and combinations thereof; wherein, n is an integer satisfying the valency of M; R is an alkyl or aromatic group; and x is an integer from 1 to 6. In some preferred embodiments, M is selected from the group consisting of Al, Bi, Ce, Cu, Fe, Pb, Sn, Sb, Ti, Y, Zn, and Zr. Exemplary metal catalysts can include dibutyl tin oxide, dibutyl tin dilaurate, zinc oxide, bismuth oxide, tin oxide, yttrium oxide, copper oxide, and combinations thereof.

Embodiments of the present disclosure include crosslinker (i.e., curing agent) compounds having nonionic metal coordinating structures. For example, in some embodiments a crosslinker for a film-forming material comprises an alkyl or aromatic compound comprising at least two functional groups reactive with a film-forming resin and at least one pendent group comprising a nonionic metal coordinating structure. Functional groups reactive with a film-forming resin include isocyanate, blocked isocyanate, uretdione, epoxide, hydroxyl, carboxyl, carbamate, aldehyde, amide, and amine groups. Crosslinkers having nonionic metal coordinating structures can coordinate metals or metal compounds, such as metal catalysts. Furthermore, these crosslinkers can be mixed with the film-forming materials of the present disclosure and/or with other resins to form coating compositions which can be used to coat substrates. For example, a method of producing a coated substrate comprises preparing a coating composition comprising a crosslinker and a film-forming material, wherein one of the crosslinker and the film-forming material comprises a nonionic metal coordinating structure; and applying the coating composition to the substrate.

In various embodiments, the nonionic metal coordinating structure of the film-forming material can be formed in situ during the resin synthesis. These embodiments include film-forming materials, and populations of various film-forming materials, having metal coordination sites situated along the polymeric backbone (i.e., interspersed with the repeating units of the polymer) and/or at the terminal ends of the resin molecules. Film-forming materials of the present disclosure can be synthesized by various reaction schemes to incorporate a nonionic metal coordinating structure into the resin during the process of the resin backbone synthesis. For example, various embodiments include a nucleophilic reaction scheme and various other embodiments include an electrophilic reaction scheme.

The resin or crosslinker is functionalized using a ligand where the ligand can comprise the nonionic metal coordinating structure. For example, various nucleophilic ligands can react with a resin that has at least one group reactive with a nucleophile, or various electrophilic ligands can react with a resin that has at least one group reactive with an electrophile. The ligands containing the nonionic metal coordinating structure can be aromatic or nonaromatic and have a reactive site (either nucleophilic or electrophilic) and one or more electron-rich sites (i.e., the nonionic metal coordinating structure).

In other various embodiments, a film-forming material comprises a product of a reaction of a poly-functional epoxide and a nucleophilic ligand. Such embodiments include products of the following exemplary reaction scheme using an epoxy resin based on the product of bisphenol A and the diglycidyl ether of bisphenol A.

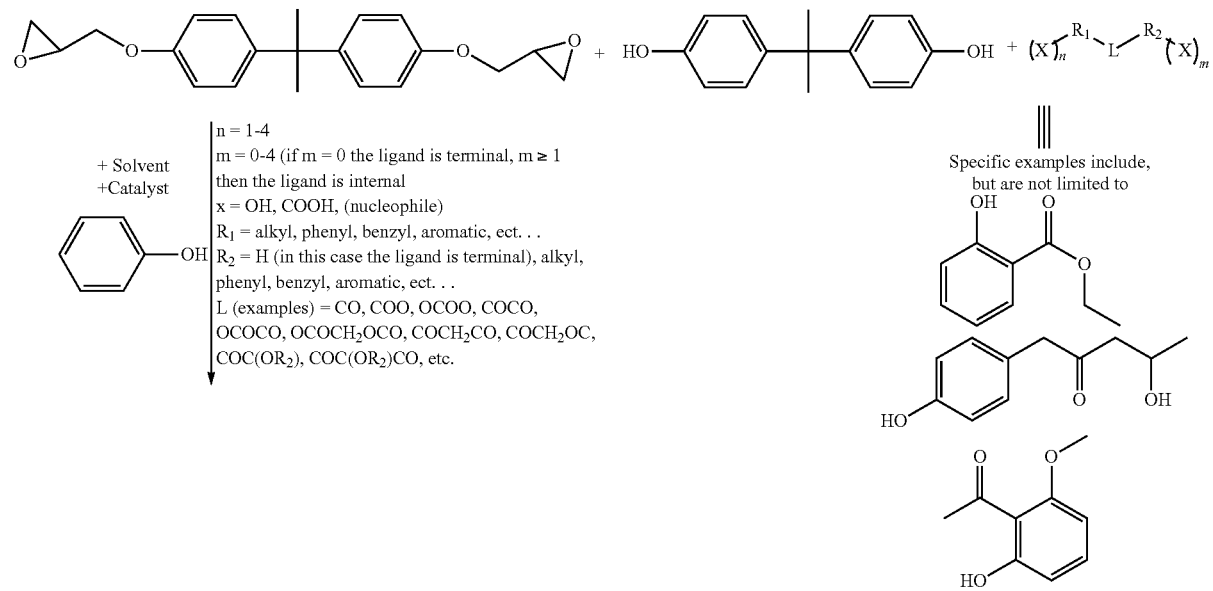

-continued

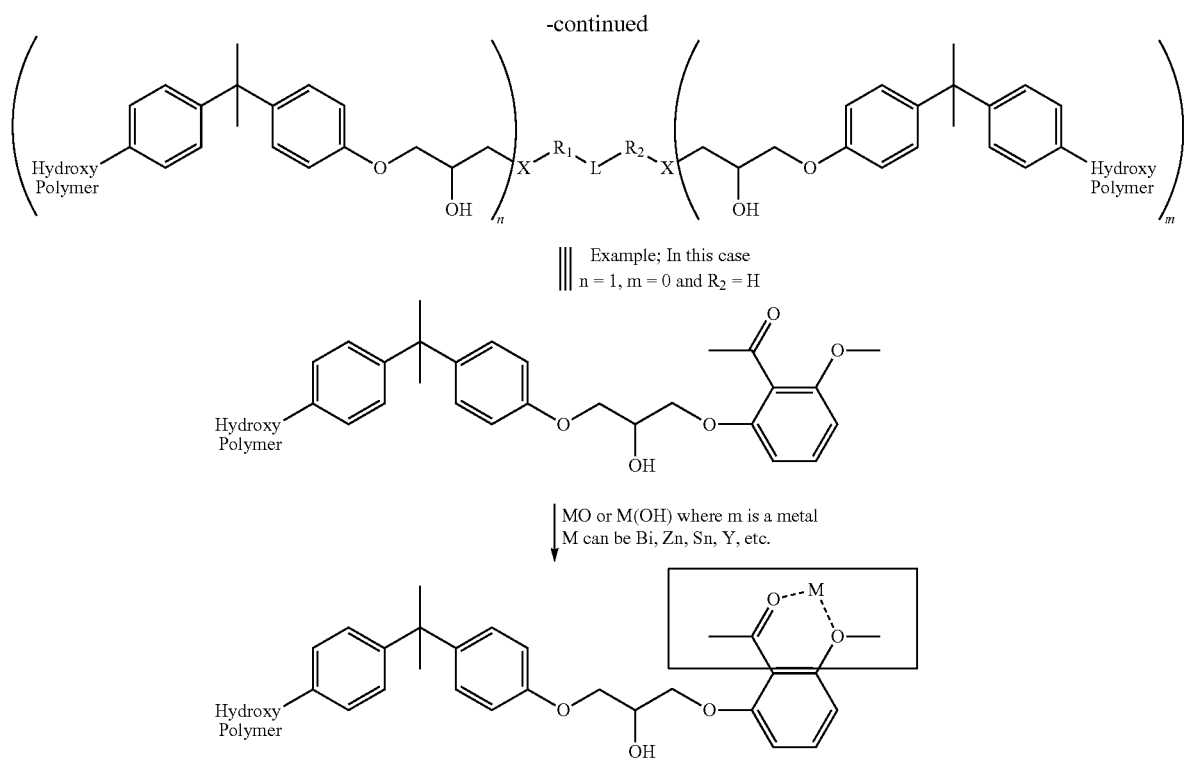

In various embodiments, a film-forming material comprises a product of a reaction of a resin, wherein the resin has at least one group reactive with a nucleophile, and a nucleophilic ligand, wherein the nucleophilic ligand has the formula:

$$X^3\text{—}R^4\text{—}X^4$$

wherein, particularly, at least one of $X^3$ and $X^4$ is reactive with the resin, $X^3$ is a hydroxyl or carboxyl monovalent radical; $R^4$ is an alkyl or aromatic divalent radical having a molecular weight from about 90 g/mol to about 5000 g/mol and a nonionic metal coordinating structure; and $X^4$ is a hydrogen, hydroxyl, or carboxyl monovalent radical.

Thus, nucleophilic ligands can have one or two nucleophilic reactive sites. For example, $X^3$ can provide a first nucleophilic reactive site in the form of a hydroxyl or carboxyl group, while $X^4$ can be hydrogen or can provide a second nucleophilic reactive site in the form of a hydroxyl or carboxyl group. As such, embodiments of nucleophilic ligands can be used for terminal addition only (i.e., where $X^4$ is hydrogen) or can be used for terminal addition and/or reaction with another group (i.e., where $X^4$ is a hydroxyl or carboxyl group), such as another epoxide group, isocyanate group, hydroxyl group, anhydride, and other groups reactive with hydroxyl or carboxyl groups. Thus, film-forming materials produced from the reaction can have terminal and/or pendent nonionic metal coordinating structures within the resin. In some embodiments, the nucleophilic ligand is selected from a group consisting of ethyl salicylate, ethylparaben, 4-hydroxy-1-(4-hydroxyphenyl)pentan-2-one, 1-(2-hydroxy-6-methoxyphenyl)ethanone, 1,5-dihydroxyanthraquinone; apigenin; baicalein; 2,2'-bipyridine-3,3'-diol; N,N'-bis(salicylidene)ethylenediamine; 4-(tert-butyldimethylsiloxy)phenol; 2-carbethoxy-5,7-dihydroxy-4'-methoxyisoflavone; 1,8-dihydroxyanthraquinone; 6,7-dihydroxyflavone; chrysophanic acid; 5,7-dihydroxyphenylcoumarin; ellagic acid; emodin; 2,3-dinitrophenol; 2,4-dinitrophenol; fisetin; 7-hydroxy-4-methyl-8-nitrocoumarin; and combinations thereof.

Embodiments of the reaction can further include other reactants, including other nucleophiles, capping agents, terminating agents, metal catalysts, and combinations thereof. Exemplary molecules include bisphenol A, bisphenol F, diols, amines, phenol, and metals and metal catalysts. In some embodiments, the resin can be a poly-functional epoxide such as diglycidyl ether of bisphenol A. In other embodiments, the resin can be an acrylic, polyurethane, polycarbonate, polysiloxane, polyvinyl, polyether, aminoplast, or polyester resin. Also included are mixtures of different resins.

In some embodiments, other nucleophiles can be included in the reaction in addition to the nucleophilic ligand. This allows the nucleophilic ligand and other nucleophiles to react with the resin to form various mixtures of film-forming materials. For example, such a reaction can result in mixed populations of film-forming materials. To illustrate, diglycidyl ether of bisphenol A, bisphenol A, and a nucleophilic ligand can react in order to form various film-forming materials where the ligand is incorporated in various positions in the resulting polymer and the film-forming material can contain populations of various polymer lengths.

In addition, in some embodiments the reaction can be performed using multiple steps, for example, where the resin (e.g., diglycidyl ether of bisphenol A) and another nucleophile (e.g., bisphenol A) are reacted first, then the nucleophilic ligand is added, and vice versa. Thus, these embodiments allow the length, proportion of different regions, and the extent of ligand incorporated in the film-forming material to be adjusted.

In other various embodiments, a film-forming material comprises a product of a reaction of a resin, wherein the resin has at least one group reactive with an electrophile, and an electrophilic ligand. Such embodiments include products of the following exemplary reaction scheme:

Thus, electrophilic ligands can have one or two electrophilic reactive sites. For example, $X^5$ can provide a first electrophilic reactive site in the form of an epoxide or halide

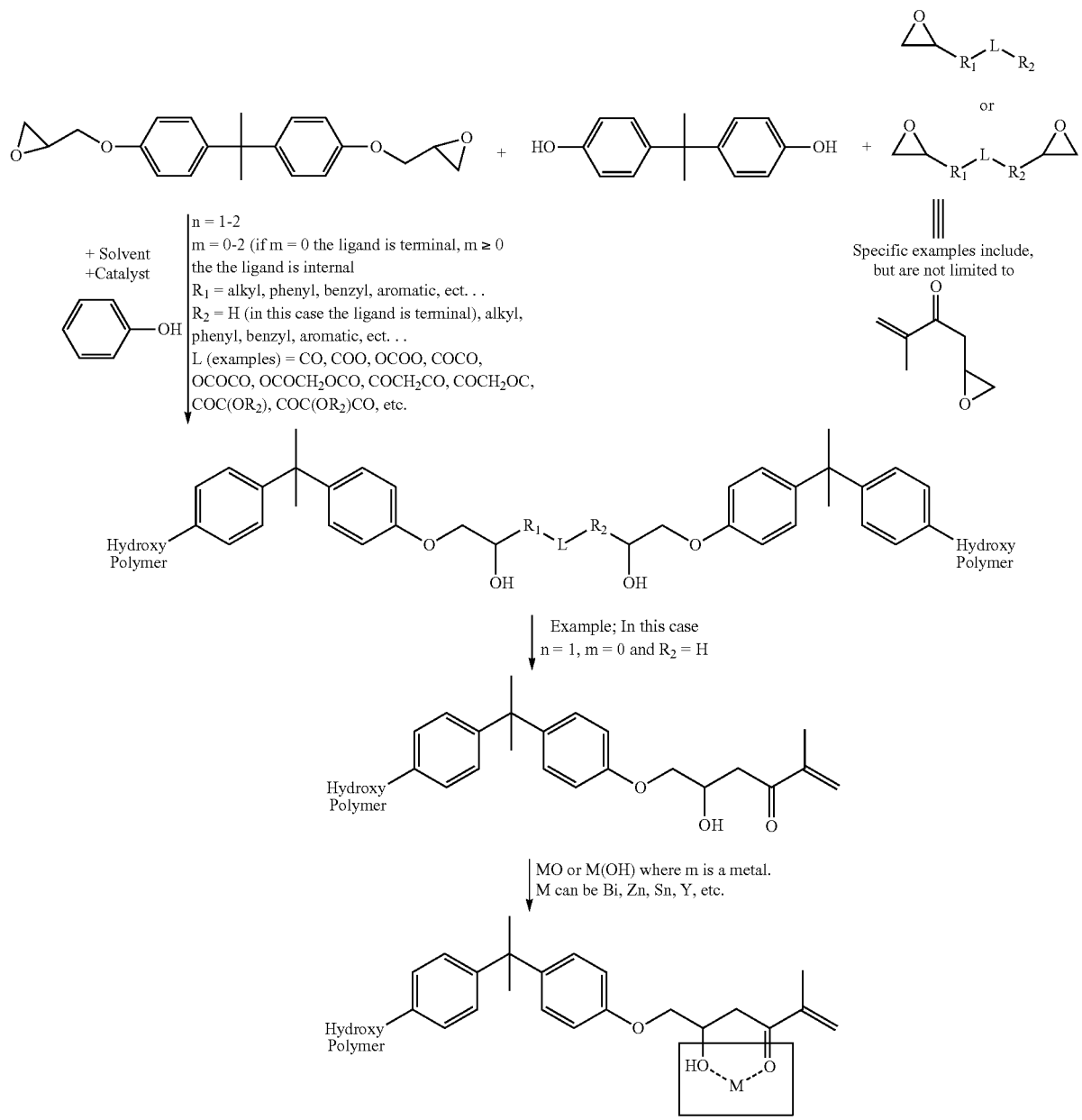

Electrophilic Approach

In some embodiments, a film-forming material comprises a product of a reaction of a resin, wherein the resin has at least one group reactive with an electrophile, and an electrophilic ligand, wherein the electrophilic ligand has the formula:

$$X^5—R^5—X^6$$

wherein, $X^5$ is an epoxide or halide monovalent radical; $R^5$ is an alkylene or arylene divalent radical, preferably having a molecular weight from about 90 g/mol to about 5000 g/mol, and a nonionic metal coordinating structure; and $X^6$ is a hydrogen, epoxide, or halide monovalent radical.

group, while $X^6$ can be hydrogen or $X^6$ can provide a second electrophilic reactive site in the form of an epoxide or halide group. As such, embodiments of electrophilic ligands can be used for terminal addition only (i.e., where $X^6$ is hydrogen) or can be used for terminal addition and/or reaction with another group. Groups reactive with epoxide or halide of the ligand that can be on the resin or reactants in forming the resin include, without limitation, primary and secondary amine groups and carboxyl and hydroxyl groups. Thus, film-forming materials produced from the reaction can have terminal and/or pendent nonionic metal coordinating structures within the resin. In some embodiments, the electrophilic ligand is selected from a group consisting of 3-methyl-1-(oxiran-2-yl) but-3-en-2-one, ethyl phenylglycidate, tert-butyldimethylsilyl glycidyl ether; diethoxy(3-glycidyloxypropyl)methylsilane; diglycidyl-1,2-cyclohexanedicarboxylate; 3,4-epoxycyclohexylmethyl-3,4-epoxycyclohexane carboxylate; 3,4-epoxytetrahydrothiophene-1,1-dioxide; ethyl-2,3-epoxypropanate; 3-glycidopropyldimethoxymethylsilane; glycidyl methacrylate; glycidyl-3-nitrobenzenesulfonate; glycidyl 4-nitrobenzoate; (3-glyloxypropyl)trimethoxysilane; glycidyl tosylate; and combinations thereof.

Embodiments of the reaction can further include other reactants, including other electrophiles, capping agents, terminating agents, metal catalysts, and combinations thereof. Exemplary molecules include bisphenol A, bisphenol F, polyols, polyamines, polycarboxylic acids, phenol, and metals and metal catalysts as described elsewhere herein. In some embodiments, the resin can be a poly-functional alcohol such as bisphenol A. In other embodiments, the resin can be an acrylic, polyurethane, polycarbonate, polysiloxane, polyvinyl, polyether, aminoplast, or polyester resin. Also included are mixtures of different resins.

In some embodiments, other electrophiles, in addition to the electrophilic ligand, can be included in the reaction. This allows the electrophilic ligand and other electrophiles to react with the resin to form various mixtures of film-forming materials. For example, such a reaction can result in mixed populations of film-forming materials. To illustrate, in the case of forming an epoxy, diglycidyl ether of bisphenol A, bisphenol A, and the electrophilic ligand can react to form various film-forming materials where the ligand is incorporated in various positions in the resulting polymer and the film-forming material can contain populations of various polymer lengths.

Furthermore, the reaction can be performed in multiple steps, for example, where the resin (e.g., bisphenol A) and the other electrophile (e.g., diglycidyl ether of bisphenol A) are reacted first, then the electrophilic ligand is added, and vice versa. Thus, these embodiments allow the length, proportion of monomers with different functionalities, and number of monomer units bearing the ligand in the film-forming material to be adjusted.

In addition to nucleophilic and electrophilic addition techniques, the present disclosure includes various embodiments where the nucleophilic or electrophilic ligand can be a chain terminator or a chain propagator or a combination thereof in the polymerization reaction. This can be accomplished by using mono-functional molecules (for chain termination) and/or poly-functional molecules (for chain propagation).

The amount of nucleophilic or electrophilic ligand in the reaction can also be optimized for specific performance characteristics. In some embodiments, it is not necessary incorporate the ligand throughout the backbone of the film-forming material. In fact, in some embodiments, most of the units in the polymer backbone do not contain incorporated ligand. The amount of incorporated ligand can be adjusted to provide enough ligand having a nonionic metal coordinating structure to coordinate with a metal and/or metal catalyst so that sufficient cure results and/or desired adhesion characteristics are realized.

In some embodiments, various components in the reaction used to form a film-forming material are adjusted to change the amount of ligand that is incorporated and/or the number of repeating units in the resin polymer. Embodiments include replacing from about 1% equivalent weight or less, to essentially replacing all of the terminal reactant (i.e., a polymer chain terminating reactant) or capping group, or the propagation group (i.e., a polymer chain propagating reactant) with ligand. Some embodiments include replacing from about 1% to about 50% equivalent weight of the terminal reactant or propagation group with ligand, and in other embodiments from about 5% to about 15% equivalent weight is used.

The amount of ligand used in the reaction can depend on whether a terminal addition product is desired or whether a polymer chain propagating ligand is to be extensively incorporated throughout the reaction product. Replacing a small amount (e.g., about 5% equivalent weight) of the terminal reactant or the propagation group in the reaction leads to sufficient incorporation of the ligand (e.g., a nucleophilic or electrophilic ligand) having a nonionic metal coordinating structure, thereby resulting in a film-forming material capable of sufficiently coordinating a metal catalyst. For example, as shown in the exemplary nucleophilic reaction scheme, some of the capping phenol can be replaced with the nucleophilic ligand accounting for about 5% equivalent weight of the total composition of the polymerized resin, where the rest of the reaction can comprise phenol, polyfunctional epoxide, and bisphenol A. In various other embodiments, substitution of more than 15% equivalent weight of the terminal or the propagation group can lead to a film-forming material incorporating a greater number of nonionic metal coordinating structures that afford increased adhesion of the coating to the metal substrate and/or coordination of metal catalyst.

In some reaction embodiments, the ligand can be used in excess so that all, or substantially all, of the ligand reactive groups, e.g., the terminal groups, of the resulting film-forming material include the ligand molecule. In other cases, the ligand can be incorporated throughout the backbone of the film-forming material. Such film-forming materials contain many nonionic metal coordinating structures and can coordinate metal catalyst and/or improve adhesion of the resin to a metal substrate.

In some embodiments, a film-forming material comprising a product of the reactions described herein can include a mixed population of resin molecules. For example, these reactions can result in film-forming material products consisting of fractions of various film-forming materials with different values for n, m, and p. These film-forming materials can result from variations in the rate of propagation and termination events in the reaction and/or by adding various reactants in stages.

It should be noted that the film-forming material comprising a product of the various reactions described herein differs from other resins and methods in which a ligand having an ionic metal coordinating structure is grafted onto a resin backbone after the polymerization process by addition of an anhydride, as described in U.S. patent application Ser. No. 11/278,030 filed Mar. 30, 2006. First, the present disclosure can be performed in a single synthesis step, and does not require a two-step grafting reaction. Second, the nonionic metal coordinating structures of the present disclosure do not have a net electrical charge, unlike ionic metal coordination groups.

The film-forming materials of the present disclosure can be used to produce coating compositions comprising the film-forming material formed by a reaction mixture comprising a resin, wherein the resin has at least one group reactive with a nucleophile, and a nucleophilic ligand and combining a crosslinker and the film-forming material, or by a reaction mixture comprising a resin, wherein the resin has at least one group reactive with an electrophile, and an electrophilic ligand and combining a crosslinker and the film-forming material. These embodiments can include the various polyfunctional epoxides, nucleophilic ligands, poly-functional alcohols, and electrophilic ligands as described for epoxy-based resins. For example, the nucleophilic and electrophilic ligands and film-forming materials include the various non-ionic metal coordinating structures as described elsewhere herein.

Coating compositions can also be produced using acrylic, polyurethane, polycarbonate, polysiloxane, aminoplast, and/or polyester resins, for example. These various resins can be formed by reactions of appropriate functional groups, as is known in the art, to produce the resin bond linkages. Such reactions include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage; and other types of linkages generally used in forming coating resins. Ligands having nonionic metal coordinating structures are incorporated into these resins using these reactive functional group pairings. The resulting film-forming resin contains a crosslinkable functionality, which can be a group reactive with a crosslinker, a self-condensing group, and/or a group curable with actinic radiation. Exemplary functional groups reactive with the film-forming resin include isocyanate, blocked isocyanate, uretdione, epoxide, hydroxyl, carboxyl, carbamate, aldehyde, amide, and amine groups.

In some embodiments, the film-forming material can comprise a vinyl or acrylic resin, wherein the vinyl resin has at least one pendent group comprising a nonionic metal coordinating structure and at least one group reactive with a crosslinker. The vinyl resin having nonionic metal coordinating structures can be formed by including a compound having an unsaturated carbon bond and a nonionic metal coordinating structure in the resin synthesis. Suitable compounds for incorporation during addition polymerization can include the following: 4-allyl-1,2-dimethoxybenzene; 2-allyl-2-methyl-1,3-cyclopentanedione; 2-allyloxytetrahydropyran; allylphenyl carbonate; 3-allylrhodanine; allyltrimethoxysilane; itaconic anhydride; and combinations thereof.

In various embodiments of producing a coating composition, the film-forming materials of the present disclosure can be the sole film-forming resin, form a population of resins, or can be combined with additional resins. As mentioned, the film-forming materials can be used as a grind resin and/or a principal resin and/or crosslinker. The same resin can be used in preparing the pigment dispersion and the principal resin, or mixtures of various resins can be used to form a coating composition. In a pigmented composition, the grind resin and the principal resin can be combined in forming a coating composition containing film-forming material(s) according to the present disclosure.

Additional resins can be included with the film-forming materials of the present disclosure. For example, suitable additional resins include epoxy oligomers and polymers, such as polymers and oligomers of polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl)ethane, bis(2-hydroxynaphthyl)methane and the like. The polyglycidyl ethers and polyhydric phenols can be condensed together to form the oligomers or polymers. Other useful poly-functional epoxide compounds are those made from novolak resins or similar poly-hydroxyphenol resins. Also suitable are polyglycidyl ethers of polyhydric alcohols such as ethylene glycol, propylene glycol, diethylene glycol and triethylene glycol. Also useful are polyglycidyl esters of polycarboxylic acids which are produced by the reaction of epichlorohydrin or a similar epoxy compound with an aliphatic or aromatic polycarboxylic acid such as succinic acid or terepthalic acid.

In some embodiments, these additional resins can be a liquid epoxy that is the reaction product of diglycidyl ether of bisphenol A and bisphenol A. Examples include modified upgraded epoxy resins having epoxy equivalent weights of approximately 100 to 1200 or more. Suitable liquid epoxies are GY2600, commercially available from Huntsman, and Epon® 828, commercially available from Hexion Specialty Chemicals, Inc. For example, epoxy-containing compounds can be reacted with hydroxyl-containing compounds, such as bisphenol A, ethoxylated bisphenol A, phenol, polyols, or substituted polyols.

These additional resins, including the various film-forming materials having nonionic metal coordinating structures, can be further reacted with an amine containing compound, such as methylaminoethanol, diethanol amine, or the diketamine derivative of diethylenetriamine, to provide a salting site on the resin for use in cathodic electrocoating. Alternatively, quaternium ammonium, sulfonium, or phosphonium sites can be incorporated. Or, the reaction products can be reacted to provide an acid functionality in order to make anodic electrocoating compositions.

In various embodiments, coating compositions can also include a mixture of resin compounds with groups reactive with a curing agent. The mixture of compounds can include more than one type of resin with groups reactive with a curing agent, a resin mixture with one or more co-monomers, and more than one resin with at least one co-monomer.

In some embodiments, the present disclosure also includes incorporating a metal, or a compound with a metal atom, with the film-forming material to complex the metal with the resin. Metals include the various metals and metal catalysts already mentioned. The metal can be added to a reaction mixture with the nucleophilic or electrophilic ligand having a nonionic metal coordinating structure, for example, or the metal can already be coordinated with the ligand prior to the film-forming material reaction. In such embodiments, the metal catalyst can be incorporated with the ligand prior to curing the resin and crosslinker to form a cured coating. Alternatively, the metal catalyst can be incorporated with the film-forming material as subpart of a coating composition; for example, the metal catalyst can be added to a film-forming material used as a grind resin.

The metal catalyst can also be incorporated at other various steps in producing the film-forming material. In some embodiments, the metal catalyst is incorporated with the nucleophilic or electrophilic ligand simultaneously with the step of forming the film-forming material, i.e., as the film-forming material is formed by the various reaction mixtures described herein. Alternatively, the metal catalyst can be incorporated with the film-forming material after the resin is formed and prior to the reaction of the resin and the crosslinker to form the cured coating. For instance, in some embodiments, a pigment-containing composition may be incorporated prior to the step of reacting (i.e., curing) the resin and the crosslinker. Coating compositions commonly incorporate such pigment-containing compositions. The metal catalyst can be incorporated into the pigment-containing composition to complex the metal catalyst with the film-forming material.

Embodiments can include one metal catalyst, or in some embodiments, a combination of metal catalysts can be employed. The metal catalysts, such as for example various metal oxides, can be supplied in a milled form having a low particle size (e.g., less than 20 microns, more typically less than 10 microns) such that no additional grinding is needed to reduce the particle size of the metal catalyst for effective incorporation of the metal catalyst with the film-forming material or ligand.

Various embodiments of methods of producing a coating composition include polyisocyanate crosslinkers (i.e., curing agents) capable of reacting with the film-forming material. Polyisocyanate crosslinkers can comprise any desired organic polyisocyanate having free isocyanate groups attached to aliphatic, cycloaliphatic, araliphatic and/or aromatic structures. Polyisocyanates can have from 2 to 5 isocyanate groups per molecule. Exemplary isocyanates are described in "Methoden der organischen Chemie" [Methods of Organic Chemistry], Houben-Weyl, volume 14/2, 4th Edition, Georg Thieme Verlag, Stuttgart 1963, pages 61 to 70, and by W. Siefken, Liebigs Ann. Chem. 562, 75 to 136. Suitable examples include 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, omega,omega'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis(isocyanatomethyl)-8-methyl-1,4-methanodecahydronaphthalene, 2,5-, 1,6- and 2,6-bis(isocyanatomethyl)-4,7-methanohexahydroindane, 1,5-, 2,5-, 1,6- and 2,6-bis(isocyanato)-4,7-methylhexahydroindane, dicyclohexyl2,4'- and 4,4'-diisocyanate, 2,4- and 2,6-hexahydrotolylene diisocyanate, perhydro 2,4'- and 4,4'-diphenylmethane diisocyanate, omega,omega'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene-1,5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanatotriphenyl methane. Polyisocyanates can also contain isocyanurate groups and/or biuret groups and/or allophanate groups and/or urethane groups and/or urea groups. Polyisocyanates containing urethane groups, for example, are obtained by reacting some of the isocyanate groups with polyols, for example trimethylol propane and glycerol. Examples of suitable crosslinkers include: unblocked and blocked polyisocyanate compounds such as self-blocking uretdione compounds; caprolactam- and oxime-blocked polyisocyanates; isocyanurates of diisocyanates; dioscyanates half-blocked with polyols; and combinations thereof.

Polyisocyanate crosslinkers can further include polymeric MDI, an oligomer of 4,4'-diphenylmethane diisocyanate, or other polyisocyanate that is blocked with an ethylene glycol ether or a propylene glycol ether. Such crosslinkers containing urethane groups can be prepared, for example, from Lupranate® M20S, or other similar commercially available materials. Polyisocyanate compounds are commercially available from, among others, BASF AG, Degussa AG, and Bayer Polymers, LLC.

In some embodiments, thermal curing can include the reaction between isocyanate (free or blocked) with an active hydrogen functional group such as a hydroxyl or a primary or secondary amine; or that between an aminoplast and an active hydrogen material such as a carbamate, urea, amide or hydroxyl group; an epoxy with an active hydrogen material such as an acid, phenol, or amine; a cyclic carbonate with an active hydrogen material such as a primary or secondary amine; a silane (i.e., Si—O—R where R=H, an alkyl or aromatic group, or an ester) with an active hydrogen material, including when the active hydrogen material is Si—OH, as well as mixtures of these crosslinking pairs.

The present disclosure also includes various embodiments where crosslinkers or curing agents include nonionic metal coordinating structures, where the nonionic metal coordinating structures include the various embodiments described elsewhere herein. In some embodiments, a method of producing a coating composition comprises forming a film-forming material by the various reaction mixtures described herein and combining a crosslinker having a nonionic metal coordinating structure and the film-forming material. For example, upon curing these coating compositions, the resulting cured film can include nonionic metal coordinating structures incorporated from the film-forming material and/or nonionic metal coordinating structures incorporated from the crosslinkers. The nonionic metal coordinating groups may be used to provide improved adhesion to metal of the coating formed from the composition. In some embodiments, the crosslinkers comprising nonionic metal coordinating structures can be complexed with one or more metal catalysts prior to forming the coating composition or the metal catalyst can be added after the crosslinker is combined with the film-forming material.

In some embodiments methods of producing a coating composition can further comprise forming a salting site on the film-forming material. The film-forming materials can be further reacted with an amine containing compound, such as methylaminoethanol, diethanol amine, or the diketamine derivative of diethylenetriamine, to provide a salting site on the resin for use in cathodic electrocoating. Alternatively, quaternium ammonium, sulfonium, or phosphonium sites can be incorporated. Or, the reaction products can be reacted with an acid functionality in order to make anodic electrocoating compositions or anionic aqueous coating compositions.

These salting sites are then reacted, or salted, in forming an aqueous dispersion in forming electrodepositable or other aqueous coating compositions, for example. The film-forming material can have basic groups salted with an acid for use in a cathodic electrocoating composition. This reaction may be termed neutralization or acid-salted and specifically refers to the reaction of pendent amino or quarternary groups with an acidic compound in an amount sufficient to neutralize enough of the basic amino groups to impart water-dispersibility to the resin. Illustrative acid compounds can include phosphoric acid, propionic acid, acetic acid, lactic acid, formic acid, sulfamic acid, alkylsulfonic acids, and citric acid. Or, an acidic resin can be salted with a base to make an anodic electrocoating composition. For example, ammonia or amines such as dimethylethanolamine, triethylamine, aminomethylpropanol, methylethanolamine, and diethanolamine can be used to form an anodic electrocoating composition.

In some embodiments, coating compositions can also include at least one additive. Many types of additives are known to be useful in coating compositions, including electrocoating compositions. Such additives can include various organic solvents, surfactants, dispersants, additives to increase or reduce gloss, catalysts, pigments, fillers, and salting agents. Additional additives further include hindered amine light stabilizers, ultraviolet light absorbers, anti-oxidants, stabilizers, wetting agents, rheology control agents, adhesion promoters, and plasticizers. Such additives are well-known and may be included in amounts typically used for coating compositions.

In some embodiments, the film-forming materials can be used in methods of producing aqueous coating compositions. The aqueous medium of a coating composition is generally exclusively water, but a minor amount of organic solvent can be used. Examples of useful solvents include, without limitation, ethylene glycol butyl ether, propylene glycol phenyl ether, propylene glycol propyl ether, propylene glycol butyl ether, diethylene glycol butyl ether, dipropylene glycol methyl ether, propylene glycol monomethyl ether acetate, xylene, N-methylpyrrolidone, methyl isobutyl ketone, mineral spirits, butanol, butyl acetate, tributyl phosphate, dibutyl phthalate, and so on. However, organic solvent can be avoided to minimize organic volatile emissions from the coating process.

Examples of suitable surfactants include, without limitation, the dimethylethanolamine salt of dodecylbenzene sulfonic acid, sodium dioctylsulfosuccinate, ethoxylated nonylphenol, sodium dodecylbenzene sulfonate, the Surfynol® series of surfactants (Air Products and Chemicals, Inc.), and Amine-C (Huntsman). Generally, both ionic and non-ionic surfactants may be used together, and, for example, the amount of surfactant in an electrocoat composition may be from 0 to 2%, based on the total solids. Choice of surfactant can also depend on the coating method. For example, an ionic surfactant should be compatible with the particular electrocoating composition, whether it is cathodic or anodic.

When the coating composition is a primer composition or pigmented topcoat composition, such as a basecoat composition, one or more pigments and/or fillers may be included. Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Coating compositions formed according to the methods described herein can be coated on a substrate by any of a number of techniques well-known in the art. These can include, for example, spray coating, dip coating, roll coating, curtain coating, knife coating, coil coating, and the like. In some embodiments, the coating composition of the invention can be electrodepositable and can be coated onto the substrate by electrodeposition. The electrodeposited or applied coating layer can be cured on the substrate by reaction of the resin and crosslinker.

The coating composition can be electrodeposited as is conventionally performed in the art. Electrodeposition includes immersing an electrically conductive article in an electrocoating bath containing a coating composition of the present invention, connecting the article as the cathode or anode, preferably as the cathode, depositing a coating composition film on the article using direct current, removing the coated article from the electrocoating bath, and subjecting the deposited electrocoated material film to conventional thermal curing, such as baking.

Coating compositions of the present invention are also useful as coil coatings. Coil coatings are applied to coiled sheet metal stock, such as steel or aluminum, in an economical, high speed process. The coil coating process results in a high quality, uniform coating with little waste of the coating and little generation of organic emissions as compared to other coating methods, e.g. spray application of a coating composition.

Polyester resins can be used as coil coating compositions and can comprise a branched polyester and/or an essentially linear polyester and a crosslinking agent. A ligand having a nonionic metal coordinating structure can be incorporated into the polyester and/or the crosslinking agent. The branched polyester can be prepared by condensation of a polyol component and a polyacid component, either of which can further include the ligand or be reactive with the ligand. The polyester synthesis may be carried out under suitable, well-known conditions, for example at temperatures from about 150° C. to about 250° C., with or without catalyst (e.g., dibutyl tin oxide, tin chloride, butyl chlorotin dihydroxide, or tetrabutyoxytitanate), typically with removal of the by-product water (e.g., by simple distillation, azeotropic distillation, vacuum distillation) to drive the reaction to completion. The crosslinking agent can have groups reactive with the hydroxyl functionality of the polyesters. Suitable crosslinking agents include, without limitation, aminoplasts and isocyanate crosslinking agents. The coil coating composition typically further includes a pigment and can contain other additives and fillers.

Coil coating is a continuous feeding operation, with the end of one coil typically being joined (e.g., stapled) to the beginning of another coil. The coil is first fed into an accumulator tower and coating is fed into an exit accumulator tower, with the accumulator towers allowing the coating operation to continue at constant speed even when intake of the coil is delayed. For example, coil advancement can be delayed to start a new roll, or for winding of the steel, for example, to cut the steel to end one roll and begin a new roll. The coil is generally cleaned to remove oil or debris, pre-treated, primed with a primer on both sides, baked to cure the primer, quenched to cool the metal, and then coated on at least one side with a topcoat. A separate backer or a different topcoat may be applied on the other side. The topcoat is baked and quenched, then fed into the exit accumulator tower and from there is re-rolled.

The coating compositions can be applied onto many different substrates, including metal substrates such as bare steel, phosphated steel, galvanized steel, gold, or aluminum; and non-metallic substrates, such as plastics and composites including an electrically conductive organic layer. In electrocoating (e.g., electrodeposition) or electrospray, only electrically conductive substrates are used. The substrate may also be any of these materials having upon it already a layer of another coating, such as a layer of an electrodeposited primer, primer surfacer, and/or basecoat, either cured or uncured. When the substrate is metallic, the film-forming material with the ligand(s) can act to improve film adhesion to the substrate.

Although various methods of curing may be used, in some embodiments, thermal curing can be used. Generally, thermal curing is effected by heating at a temperature and for a length of time sufficient to cause the reactants (i.e., the film-forming material and crosslinker) to form an insoluble polymeric network. The cure temperature can be from about 150° C. to about 200° C. for electrocoating compositions, and the length of cure can be about 15 minutes to about 60 minutes. Cure temperatures can be lower, for example, and in some embodiments can be reduced to 160° C. or lower due to the metal catalysts complexed to the nonionic metal coordination structures in the film-forming materials. Therefore, lower bake temperatures can be used in some instances. Heating can be done in infrared and/or convection ovens.

A coil coating composition cures at a given peak metal temperature. The peak metal temperature can be reached more quickly if the oven temperature is high. Oven temperatures for coil coating generally range from about 220° C. to about 500° C., to obtain peak metal temperatures of between 180° C. and about 250° C., for dwell times generally ranging from about 15 seconds to about 80 seconds. Oven temperatures, peak metal temperature and dwell times are adjusted according to the coating composition, substrate and level of cure desired. Examples of coil coating methods are disclosed in U.S. Pat. Nos. 6,897,265; 5,380,816; 4,968,775; and 4,734,467, which are hereby incorporated by reference.

The film-forming materials, coating compositions, and methods of the present disclosure provide several advantages. For example, pretreatment of metal surfaces, such as phosphating, can be eliminated due to increased adhesion and corrosion performance of coating compositions made according to present disclosure. Increased adhesion can be due to complexes forming between the nonionic metal coordinating sites incorporated in the film-forming material and the metal substrate. Elimination of the phosphating step in coating a steel substrate can save time and expense. Furthermore, complexing metal catalysts with the film-forming material (or ligands used to form the resin) can improve cure response and catalytic efficiency of the applied coating composition. These improvements can be effected by the proximity of the metal catalyst to the reactive functional groups in the crosslinking matrix.

The present technology is further described in the following examples. The examples are merely illustrative and do not in any way limit the scope of the technology as described and claimed. All parts given are parts by weight unless otherwise noted. Tradename compounds suitable for practicing embodiments of the technology may be included, where applicable.

Examples 1A-1D

Examples 1A through 1D are prepared as described and as indicated in the respective tables. Example 1A makes use of phenol as a chain terminating ligand, the ligand is added in less the 5% by weight of the total composition of the polymer. Example 1B makes use of the same ligand molecule, in this case the terminal group is replaced with ethylphenylglycidate and the amount of bisphenol A is increased to leave the same equivalents of unreacted epoxy after the polymer upgrade reaction is completed before the amine capping step. In Example 1C, half of the capping group is replaced with ethylphenylglycidate and the other half is replaced with ethyl-4-hydroxybenzoate. Once again the bisphenol A and liquid epoxy are adjusted to leave the same equivalents of unreacted epoxy after the polymer upgrade reaction is completed. In example 1D, the capping group is replaced with ethyl 4-hydroxybenzoate.

The reaction products are emulsified in water as Emulsions 1A to 1D. Additionally, a pigment-containing composition, also known as a pigment paste, is used. In these examples, the metal catalyst is incorporated into the pigment paste and the pigment paste containing the metal catalyst is incorporated into the emulsion to establish an electrocoat bath where the metal catalyst complexes with the hydroxy-functional film-forming material.

Emulsion Example 1A

The following materials are combined in a 5 L flask with an associated heating mantle:
diglycidyl ether of bisphenol A (DGEBA), (652.05 g, 6.4 eq. epoxy),
bisphenol A (BPA), (148.27 g, 2.0 eq. OH),
phenol,
ethyl phenylglycidate (34.14 g, 0.3 eq), and
butoxypropanol (25.16 g)

While stirring, the temperature is raised to 125° C. Subsequently, triphenyl phosphine (1.16 g) is added and the exotherm is recorded (189° C.). The mixture is then allowed to cool to 132° C., and a weight per epoxide (WPE) determination (target=525+/−25) is conducted and is 550. After cooling to 82° C. and turning off the heating mantle, 92.24 g of Synfac 8009 (a plasticizer) is added, 1.10 eq. N of a mixture of secondary amines is introduced and the exotherm is recorded (105° C.). The mixture is allowed to stir for an additional 30 minutes after reaching exotherm. After stirring for 30 minutes, 3-dimethylaminopropylamine is added at 105° C. (30.46 g, 0.55 eq.), and the exotherm is recorded (142° C.). The mixture is stirred for an additional hour. The crosslinker (491.40 g) is added. The crosslinker is a blocked isocyanate based on polymeric MDI and monofunctional alcohols.

After achieving a homogeneous mixture, the resin and crosslinker blend is added to an acid/water mixture, under constant stirring, of deionized water (1152 g) and formic acid (88%) (15.57 g). After thoroughly mixing all components using a metal spatula, the solids are further reduced by addition of water (1142 g). A flow-additive package (94 g) is added to the acid mixture. All raw materials, including the various solvents used above, are industrial grade and no further purifications are made, Emulsion Example 1B The following materials are combined in a 5 L flask with an associated heating mantle:
diglycidyl ether of bisphenol A, DGEBA, (619.45 g, 6.4 eq. epoxy),
bisphenol A, BPA, (258.24 g, 2.2 eq. OH),
ethyl phenylglycidate (108.12 g, 1.0 eq), and
butoxypropanol (23.90 g)

While stirring, the temperature is raised to 125° C. Subsequently, triphenyl phosphine (1.16 g) is added and the exotherm is recorded (189° C.). The mixture is then allowed to cool to 132° C., and a WPE determination (target=620+/−25) is conducted and is 605. After cooling to 82° C. and turning off the heating mantle, 87.63 g of Synfac 8009 (a plasticizer) is added, 1.10 eq. N of a mixture of secondary amines is introduced and the exotherm is recorded (105° C.). The mixture is allowed to stir for an additional 30 minutes after reaching exotherm. After stirring for 30 minutes, 3-dimethylaminopropylamine is added at 107° C. (28.93 g, 0.55 eq.), and the exotherm is recorded (145° C.) The mixture is stirred for an additional hour. The crosslinker (466.83 g) is added. The crosslinker is a blocked isocyanate based on polymeric MDI and monofunctional alcohols, such as diethylene glycol butyl ether. After achieving a homogeneous mixture, the resin and crosslinker blend is added to an acid/water mixture, under constant stirring, of deionized water (1152 g) and formic acid (88%) (28.93 g) After thoroughly mixing all components using a metal spatula, the solids are further reduced by addition of water (1085 g). A flow-additive package (89.3 g) is added to the acid mixture. All raw materials, including the various solvents used above, are industrial grade and no further purifications are made.

Emulsion Example 1C

The following materials are combined in a 5 L flask with an associated heating mantle:
diglycidyl ether of bisphenol A, DGEBA, (619.45 g, 6.4 eq. epoxy),
bisphenol A, BPA, (258.24 g, 2.2 eq OH),
ethyl phenylglycidate (54.06 g, 0.5 eq),
ethyl 4-hydroxybenzoate (42.73 g, 0.5 eq.) and butoxypropanol (23.90 g)

While stirring, the temperature is raised to 125° C. Subsequently, triphenyl phosphine (1.16 g) is added and the exotherm is recorded (183° C.). The mixture is then allowed to cool to 132° C., and a WPE determination (target=600+/−25) is conducted and is 605. After cooling to 82° C. and turning off the heating mantle, 87.63 g of Synfac 8009 (a plasticizer) is added, 1.10 eq. N of a mixture of secondary amines is introduced and the exotherm is recorded (105° C.). The mixture is allowed to stir for an additional 30 minutes after reaching exotherm. After stirring for 30 minutes, 3-dimethylaminopropylamine is added at 107° C. (28.93 g, 0.55 eq.), and the exotherm is recorded (145° C.). The mixture is stirred for an additional hour. The crosslinker (466.83 g) is added. The crosslinker is a blocked isocyanate based on polymeric MDI and monofunctional alcohols, such as diethylene glycol butyl ether. After achieving a homogeneous mixture, the resin and crosslinker blend is added to an acid/water mixture, under constant stirring, of deionized water (1152 g) and formic acid (88%) (28.93 g). After thoroughly mixing all components using a metal spatula, the solids are further reduced by addition of water (1085 g). A flow-additive package (89.3 g) is added to the acid mixture. All raw materials, including the various solvents used above, are industrial grade and no further purifications are made.

Emulsion Example 1D

The following materials are combined in a 5 L flask with an associated heating mantle:
diglycidyl ether of bisphenol A, DGEBA, (619.45 g, 6.4 eq. epoxy),
bisphenol A, BPA, (140.86 g, 1.2 eq OH),
ethyl 4-hydroxybenzoate (85.46 g, 0.5 eq.) and butoxypropanol (23.90 g)

While stirring, the temperature is raised to 125° C. Subsequently, triphenyl phosphine (1.10 g) is added and the exotherm is recorded (185° C.). The mixture is then allowed to cool to 132° C., and a WPE determination (target=560+/−25) is conducted and is 550. After cooling to 82° C. and turning off the heating mantle, 87.63 g of Synfac 8009 (a plasticizer) is added, 1.10 eq. N of a mixture of secondary amines is introduced and the exotherm is recorded (107° C.). The mixture is allowed to stir for an additional 30 minutes after reaching exotherm. After stirring for 30 minutes, 3-dimethylaminopropylamine is added at 107° C. (28.93 g, 0.55 eq.), and the exotherm is recorded (145° C.). The mixture is stirred for an additional hour. The crosslinker (466.83 g) is added. The crosslinker is a blocked isocyanate based on polymeric MDI and monofunctional alcohols, such as diethylene glycol butyl ether. After achieving a homogeneous mixture, the resin and crosslinker blend is added to an acid/water mixture, under constant stirring, of deionized water (1152 g) and formic acid (88%) (28.93 g). After thoroughly mixing all components using a metal spatula, the solids are further reduced by addition of water (1085 g). A flow-additive package (89.3 g) is added to the acid mixture. All raw materials, including the various solvents used above, are industrial grade and no further purifications are made.

The paste used in the electrodeposition formulation examples 1A-1D was prepared as described in U.S. Pat. No. 6,951,602 to Reuter et al., which is incorporated herein by reference.

Preparation of the Pigment Paste

Preparation of a Grinding Resin Solution having Tertiary Ammonium Groups: In accordance with EP 0 505 445 B1, Example 1.3, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol and 206 parts of butyl glycol in a stainless steel reaction vessel in the presence of 4 parts of triphenylphosphine at 130° C. until an EEW of 865 g/eq is reached. In the course of cooling, the batch is diluted with 849 parts of butyl glycol and 1534 parts of D.E.R.® 732 (polypropylene glycol diglycidyl ether, DOW Chemical, USA) and is reacted further at 90° C. with 266 parts of 2,2'aminoethoxyethanol and 212 parts of N,N-dimethylaminopropylamine. After 2 hours, the viscosity of the resin solution is constant (5.3 dPa·s; 40% in Solvenon® PM (methoxypropanol, BASF/Germany); cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation of the Pigment Paste: For this purpose, a premix is first formed from 1897 parts of water and 1750 parts of the grinding resin solution described above. Then 21 parts of Disperbyk® 110 (Byk-Chemie GmbH/Germany), 14 parts of Lanco Wax® PE W 1555 (Langer & Co./Germany), 42 parts of carbon black, 420 parts of aluminum hydrosilicate ASP 200 (Langer & Co./Germany), 2667 parts of titanium dioxide TI-PURE® R 900 (DuPont, USA) and 189 parts of di-n-butyltin oxide are added. The mixture is predispersed for 30 minutes under a high-speed dissolver stirrer. The mixture is subsequently dispersed in a small laboratory mill (Motor Mini Mill, Eiger Engineering Ltd, Great Britain) for from 1 to 1.5 h to a Hegmann fineness of less than or equal to 12 μm and adjusted to solids content with additional water. A separation-stable pigment paste P1 is obtained. Solids content: 60.0% (½ h at 180° C.)

Electrodeposition Formulation for Example 1A

TABLE 1

Example 1A Variables

| | |
|---|---|
| Bath Size (grams) | 2500.00 |
| Bath % NV | 19 |
| Bath P/B | 0.16 |
| Paste P/B | 3.1 |

TABLE 1-continued

Example 1A Variables

| Paste % NV | 67.5 |
|---|---|
| Emulsion % NV | 44.1 |

| Grams of Paste | Grams of Emulsion | Grams of Water |
|---|---|---|
| 128 | 880 | 1491 |

In a 1-gallon bucket the emulsion and water are mixed with constant stirring. The paste is added while stirring.

Electrodeposition Formulation for Example 1B

TABLE 2

Example 1B Variables

| Bath Size (grams) | 2500 |
|---|---|
| Bath % NV | 19 |
| Bath P/B | 0.16 |
| Paste P/B | 3.1 |
| Paste % NV | 67.5 |
| Emulsion % NV | 27.1 |

| Grams of Paste | Grams of Emulsion | Grams of Water |
|---|---|---|
| 128 | 1433 | 938 |

In a 1-gallon bucket the emulsion and water are mixed with constant stirring. The paste is added while stirring.

Electrodeposition Formulation for Example 1C

TABLE 3

Example 1C Variables

| Bath Size (grams) | 2500 |
|---|---|
| Bath % NV | 19 |
| Bath P/B | 0.16 |

TABLE 3-continued

Example 1C Variables

| Paste P/B | 3.1 |
|---|---|
| Paste % NV | 67.5 |
| Emulsion % NV | 32.8 |

| Grams of Paste | Grams of Emulsion | Grams of Water |
|---|---|---|
| 128 | 1183 | 1187 |

In a 1-gallon bucket the emulsion and water are mixed with constant stirring The paste is added while stirring.

Electrodeposition Formulation for Example 1D

TABLE 4

Example 1D Variables

| Bath Size (grams) | 2500 |
|---|---|
| Bath % NV | 19 |
| Bath P/B | 0.16 |
| Paste P/B | 3.1 |
| Paste % NV | 67.5 |
| Emulsion % NV | 39.4 |

| Grams of Paste | Grams of Emulsion | Grams of Water |
|---|---|---|
| 128 | 985 | 1385 |

In a 1-gallon bucket the emulsion and water are mixed with constant stirring. The paste is added while stirring.

With the aqueous coating compositions of Examples 1A-1D formed, test panels are prepared (described in detail below) to ascertain properties of coatings prepared from Examples 1A-1D. Tests include a MEK Double Rub Solvent Resistance Test and Corrosion Test; details of these tests are further described below. Two types of panel substrates are employed: phosphate treated cold rolled steel (CRS) panels and bare CRS. All panels are 4"×6" in dimension and are purchased from ACT. The panels are electrocoated to film builds of approximately 0.40 mil and 0.80 mil, depending on the particular test.

Voltage ladders are prepared to observe how voltage affects film build and are tabulated for the two different substrates at three different bake temperatures.

TABLE 5

Example 1A, phosphate treated CRS panels

| Voltage (volts) | @ 300° F. Bake | | | @ 325° F. Bake | | | @ 350° F. Bake | | |
|---|---|---|---|---|---|---|---|---|---|
| | Bath Temp ° F. | Energy Consume (couls) | Film Build (mils) | Bath Temp ° F. | Energy Consume (couls) | Film Build (mils) | Bath Temp ° F. | Energy Consume (couls) | Film Build (mils) |
| 100 | 90.4 | 34 | 0.499 | 90.0 | 34 | 0.470 | 89.8 | 34 | 0.438 |
| 125 | 89.6 | 34 | 0.517 | 89.6 | 38 | 0.480 | 90.2 | 34 | 0.482 |
| 150 | 90.4 | 35 | 0.679 | 90.8 | 35 | 0.668 | 90.8 | 35 | 0.660 |
| 175 | 90.8 | 36 | 0.713 | 91 | 36 | 0.695 | 91.6 | 35 | 0.720 |
| 200 | 90.8 | 39 | 0.781 | 90.8 | 38 | 0.755 | 90.6 | 39 | 0.736 |
| 225 | 90.6 | 40 | 0.846 | 90.2 | 40 | 0.797 | 90.6 | 40 | 0.798 |
| 250 | 90.6 | 43 | 0.942 | 91 | 44 | 0.943 | 90.8 | 43 | 0.884 |

TABLE 6

Example 1A, Bare CRS panels

| Voltage (volts) | @ 300° F. Bake | | | @ 325° F. Bake | | | @ 350° F. Bake | | |
|---|---|---|---|---|---|---|---|---|---|
| | Bath Temp ° F. | Energy Consume (couls) | Film Build (mils) | Bath Temp ° F. | Energy Consume (couls) | Film Build (mils) | Bath Temp ° F. | Energy Consume (couls) | Film Build (mils) |
| 100 | 89.8 | 46 | 0.792 | 90.0 | 46 | 0.766 | 90.4 | 47 | 0.766 |
| 125 | 89.6 | 48 | 0.955 | 90.0 | 49 | 0.963 | 90.2 | 49 | 0.963 |
| 150 | 91.2 | 45 | 1.018 | 92.0 | 45 | 0.957 | 92.4 | 44 | 0.922 |
| 175 | 91.8 | 47 | 1.078 | 93.0 | 47 | 1.002 | 92.8 | 47 | 0.978 |
| 200 | 90.4 | 47 | 1.009 | 90.8 | 48 | 1.001 | 90.6 | 48 | 0.986 |
| 225 | 90.2 | 47 | 1.025 | 90.8 | 48 | 1.008 | 90.6 | 48 | 0.948 |
| 250 | 91.0 | 51 | 1.135 | 91.4 | 50 | 1.073 | 90.8 | 50 | 1.047 |

TABLE 7

Example 1B, phosphate treated CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 90.0 | 39 | 0.157 | 90.0 | 39 | 0.167 | 90.0 | 39 | 0.131 |
| 125 | 89.8 | 41 | 0.179 | 89.6 | 40 | 0.189 | 89.6 | 40 | 0.151 |
| 150 | 89.6 | 41 | 0.235 | 89.6 | 42 | 0.235 | 89.8 | 42 | 0.229 |
| 175 | 90.4 | 44 | 0.288 | 89.8 | 44 | 0.302 | 90.0 | 44 | 0.288 |
| 200 | 89 | 49 | 0.461 | 89.6 | 43 | 0.321 | 90.0 | 44 | 0.287 |
| 225 | 90.4 | 46 | 0.398 | 90.2 | 46 | 0.374 | 90.8 | 46 | 0.379 |
| 250 | 90.1 | 48 | 0.453 | 90.4 | 48 | 0.448 | 90.6 | 48 | 0.393 |

TABLE 8

Example 1B, Bare CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 90.2 | — | 0.283 | 90.4 | — | 0.277 | 90.6 | — | 0.261 |
| 125 | 89.6 | 50 | 0.303 | 89.4 | 51 | 0.299 | 89.6 | 51 | 0.244 |
| 150 | 90.2 | 53 | 0.342 | 90.6 | 53 | 0.312 | 90.8 | 52 | 0.311 |
| 175 | — | — | 0.407 | — | — | 0.381 | — | — | 0.355 |
| 200 | 90.4 | 54 | 0.454 | 91.0 | 54 | 0.422 | 90.2 | 54 | 0.381 |
| 225 | 90.2 | 55 | 0.474 | 90.8 | 55 | 0.431 | 90.8 | 55 | 0.468 |
| 250 | 90.6 | 62 | 0.538 | 91.0 | 56 | 0.501 | 91.2 | 57 | 0.501 |

TABLE 9

Example 1C, phosphate treated CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 90.6 | 44 | 0.179 | 90.4 | 46 | 0.157 | 90.4 | 45 | 0.125 |
| 125 | 89.8 | 46 | 0.148 | 89.6 | 45 | 0.136 | 89.6 | 44 | 0.116 |
| 150 | 90.2 | 44 | 0.171 | 90.4 | 44 | 0.157 | 90.2 | 45 | 0.171 |
| 175 | 90.2 | 45 | 0.228 | 90.4 | 45 | 0.222 | 90.0 | 45 | 0.189 |
| 200 | 90.2 | 46 | 0.238 | 90.0 | 46 | 0.267 | 90.4 | 46 | 0.252 |
| 225 | 90.8 | 52 | 0.399 | 90.4 | 50 | 0.337 | 90.0 | 51 | 0.361 |
| 250 | 89.8 | 63 | 0.742 | 91.0 | 63 | 0.405 | 92.6 | 57 | 0.459 |

TABLE 10

Example 1C, Bare CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 90.0 | 51 | 0.201 | 90.0 | 51 | 0.174 | 90.0 | 51 | 0.156 |
| 125 | 89.6 | 53 | 0.239 | 90.0 | 53 | 0.279 | 90.0 | 55 | 0.181 |
| 150 | 90.4 | 57 | 0.345 | 90.4 | 57 | 0.331 | 90.6 | 56 | 0.312 |
| 175 | 89.8 | 56 | 0.379 | 90.4 | 56 | 0.363 | 90.8 | 58 | 0.351 |
| 200 | 90.4 | 60 | 0.455 | 90.4 | 60 | 0.401 | 90.4 | 60 | 0.387 |
| 225 | 90.4 | 62 | 0.487 | 89.6 | 68 | 0.690 | 90.4 | 68 | 0.483 |
| 250 | 90.6 | 71 | 0.757 | 91.8 | 70 | 0.757 | 94.0 | 68 | 0.680 |

TABLE 11

Example 1D, phosphate treated CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 89.5 | 34 | 0.230 | 89.5 | 34 | 0.201 | 89.5 | 34 | 0.210 |
| 125 | 90.0 | 38 | 0.275 | 90.1 | 38 | 0.249 | 90.3 | 38 | 0.270 |
| 150 | 90.3 | — | 0.313 | 90.3 | — | 0.301 | 90.2 | 40 | 0.321 |
| 175 | 90.1 | 41 | 0.370 | 90.3 | — | 0.298 | 90.1 | 43 | 0.361 |
| 200 | 89.7 | 43 | 0.405 | 90.0 | 43 | 0.382 | 90.2 | 44 | 0.423 |
| 225 | 90.1 | 44 | 0.462 | 90.5 | 44 | 0.445 | 90.3 | — | 0.427 |
| 250 | 89.0 | 44 | 0.806 | 90.0 | 44 | 0.463 | 90.3 | 44 | 0.506 |
| 300 | 90.5 | 50 | 0.675 | 90.7 | 50 | 0.624 | 90.3 | 51 | 0.638 |

TABLE 12

Example 1D, Bare CRS panels

| Voltage (volts) | @ 300° F. Bake | | | @ 325° F. Bake | | | @ 350° F. Bake | | |
|---|---|---|---|---|---|---|---|---|---|
| | Bath Temp. ° F. | Energy Consume (couls) | Film Build (mils) | Bath Temp. ° F. | Energy Consume (couls) | Film Build (mils) | Bath Temp. ° F. | Energy Consume (couls) | Film Build (mils) |
| 100 | 89.7 | 39 | 0.336 | 89.8 | 41 | 0.297 | 89.9 | 40 | 0.302 |
| 125 | 90.4 | 42 | 0.403 | 90.3 | 41 | 0.391 | 90.2 | 41 | 0.380 |
| 150 | 90.1 | 43 | 0.497 | 90.2 | 44 | 0.455 | 90.1 | 43 | 0.450 |
| 175 | 90.3 | 45 | 0.504 | 90.1 | 45 | 0.510 | 90.3 | 49 | 0.502 |
| 200 | 90.3 | 49 | 0.511 | 90.4 | 47 | 0.461 | 90.5 | 47 | 0.482 |
| 225 | 90.0 | 49 | 0.539 | 90.3 | 49 | 0.519 | 89.9 | 50 | 0.573 |
| 250 | 90.4 | 54 | 0.577 | 90.4 | 54 | 0.549 | 90.7 | 50 | 0.635 |
| 300 | 90.3 | 57 | 0.716 | 89.7 | 56 | 0.669 | 90.7 | 58 | 0.713 |

MEK Double Rub Solvent Resistance Test:

As an initial screening tool to assess cure, methyl ethyl ketone (MEK) double rubs are carried out. The panels are CRS with and without the zinc phosphate treatment and the coating compositions are applied and cured at various times and temperatures to form cured coatings.

Using a piece of cheese cloth soaked with MEK and wrapped around the index finger, a total of 25, and 50, double rubs are carried out using slight pressure. After the double rubs, the panels are rated: 0 (no change), 1 (slight change), 3 (moderate change), and 5 (severe change—metal exposure, failure).

Complete data for the MEK double rub solvent resistance test of Examples 1A-1D are found in Tables 13-20. Data for a comparative commercial coating composition, Catho-Guard® 500 (BASF Corp.), is presented in Table 21. In addition to MEK data, the tables also include gloss data measured at a 60° angle.

TABLE 13

Example 1A, phosphate treated CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 5 | 5 | 100.0 | 1 | 2 | 97.2 | 0 | 1 | 94.6 |
| 125 | 5 | 5 | 98.3 | 1 | 2 | 91.5 | 0 | 0 | 100.8 |
| 150 | 3 | 3 | 99.6 | 1 | 1 | 99.9 | 0 | 0 | 91.3 |
| 175 | 3 | 3 | 98.8 | 1 | 1 | 101.7 | 0 | 0 | 98.7 |
| 200 | 3 | 3 | 100.3 | 1 | 1 | 101.1 | 0 | 1 | 96.6 |
| 225 | 3 | 3 | 99.8 | 1 | 1 | 99.5 | 0 | 1 | 91.5 |
| 250 | 3 | 3 | 98.1 | 1 | 2 | 93.5 | 0 | 1 | 83.5 |

TABLE 14

Example 1A, Bare CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 2 | 3 | 98.7 | 1 | 1 | 99.9 | 0 | 1 | 97.9 |
| 125 | 2 | 3 | 97.0 | 1 | 1 | 99.8 | 0 | 0 | 95.2 |
| 150 | 2 | 3 | 96.2 | 1 | 1 | 100.5 | 0 | 0 | 95.6 |
| 175 | 2 | 3 | 99.7 | 1 | 1 | 98.4 | 0 | 0 | 95.4 |
| 200 | 2 | 3 | 101.1 | 1 | 1 | 97.2 | 0 | 0 | 95.2 |
| 225 | 2 | 3 | 98.6 | 1 | 1 | 95.0 | 0 | 0 | 88.5 |
| 250 | 2 | 3 | 97.8 | 1 | 1 | 92.6 | — | — | — |

TABLE 15

Example 1B, phosphate treated CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 5 | 5 | 99.6 | 5 | 5 | 94.0 | 1 | 1 | 78.3 |
| 125 | 5 | 5 | 97.5 | 4 | 4 | 92.0 | 0 | 1 | 79.7 |
| 150 | 5 | 5 | 96.5 | 4 | 5 | 91.5 | 0 | 1 | 80.6 |
| 175 | 5 | 5 | 97.1 | 3 | 4 | 91.5 | 0 | 1 | 86.1 |
| 200 | 5 | 5 | 98.6 | 4 | 5 | 937 | 0 | 1 | 87.2 |
| 225 | 5 | 5 | 100.0 | 3 | 3 | 99.1 | 1 | 1 | 87.4 |
| 250 | 5 | 5 | 99.5 | 2 | 2 | 99.8 | 0 | 1 | 96.7 |
| 300 | 2 | 3 | 90.0 | — | — | — | — | — | — |

TABLE 16

Example 1B, Bare CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 5 | 5 | 98.6 | 2 | 3 | 94.7 | 1 | 2 | 90.7 |
| 125 | 5 | 5 | 98.5 | 2 | 3 | 94.0 | 1 | 1 | 87.3 |
| 150 | 5 | 5 | 98.6 | 2 | 3 | 93.0 | 1 | 1 | 87.1 |
| 175 | 5 | 5 | 99.4 | 2 | 2 | 96.2 | 0 | 1 | 88.1 |
| 200 | 5 | 5 | 100.0 | 1 | 2 | 96.5 | — | — | — |
| 225 | 4 | 5 | 99.4 | 1 | 2 | 93.8 | 0 | 0 | 93.0 |
| 250 | 4 | 4 | 94.9 | 1 | 2 | 97.7 | 0 | 0 | 90.2 |

TABLE 17

Example 1C, phosphate treated CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 5 | 5 | 98.4 | 4 | 5 | 85.1 | 4 | 5 | 81.5 |
| 125 | 5 | 5 | 88.6 | 5 | 5 | 86.8 | 2 | 3 | 79.2 |
| 150 | — | — | — | 4 | 5 | 91.4 | 2 | 3 | 82.0 |
| 175 | 5 | 5 | 97.9 | 4 | 4 | 90.8 | 1 | 2 | 75.4 |
| 200 | 5 | 5 | 99.2 | 3 | 4 | 90.7 | 0 | 0 | 74.4 |
| 225 | 4 | 5 | 99.4 | 2 | 2 | 85.5 | 0 | 0 | 74.5 |
| 250 | 4 | 4 | 98.5 | 2 | 2 | 96.3 | 0 | 0 | 76.7 |

TABLE 18

Example 1C, Bare CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 5 | 5 | 96.7 | 2 | 3 | 84.0 | 2 | 3 | 79.9 |
| 125 | 5 | 5 | 99.9 | 2 | 3 | 79.8 | 0 | 1 | 80.5 |
| 150 | 5 | 5 | 98.6 | 2 | 3 | 96.4 | 0 | 1 | 89.3 |
| 175 | 5 | 5 | 100 | 2 | 3 | 96.1 | 0 | 0 | 85.0 |
| 200 | 5 | 5 | 95.7 | 0 | 1 | 92.3 | 0 | 0 | 81.5 |
| 225 | 5 | 5 | 95.0 | 0 | 1 | 94.0 | 0 | 0 | 96.6 |
| 250 | 5 | 5 | 98.8 | 1 | 1 | 95.0 | 0 | 0 | 87.0 |

TABLE 19

Example 1D, phosphate treated CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 4 | 5 | 80.8 | 1 | 2 | 84.3 | 0 | 1 | 70.5 |
| 125 | 4 | 4 | 91.0 | 0 | 1 | 80.4 | 0 | 0 | 66.3 |
| 150 | 4 | 4 | 86.1 | 0 | 0 | 72.3 | 0 | 0 | 65.8 |
| 175 | 3 | 4 | 89.2 | 0 | 1 | 73 | 0 | 0 | 69.2 |
| 200 | 3 | 4 | 94.2 | 1 | 2 | 82.7 | 0 | 0 | 69.7 |
| 225 | 2 | 3 | 97.4 | 0 | 0 | 93.5 | 0 | 0 | 81.7 |
| 250 | 2 | 2 | 92.9 | 0 | 0 | 52.4 | — | — | — |
| 300 | — | — | — | 0 | 0 | 76.1 | 0 | 0 | 71.4 |

TABLE 20

Example 1D, Bare CRS panels

| Voltage (volts) | @ 300° F. Bake | | | @ 325° F. Bake | | | @ 350° F. Bake | | |
|---|---|---|---|---|---|---|---|---|---|
| | MEK 25 rubs | MEK 50 rubs | Gloss | MEK 25 rubs | MEK 50 rubs | Gloss | MEK 25 rubs | MEK 50 rubs | Gloss |
| 100 | 4 | 4 | 95.9 | 1 | 2 | 86.2 | 0 | 0 | 81.4 |
| 125 | 4 | 4 | 99.4 | 0 | 1 | 85.9 | 0 | 0 | 77.5 |
| 150 | 4 | 4 | 87.8 | 0 | 1 | 86.9 | 0 | 0 | 77.7 |
| 175 | 1 | 2 | 92.5 | 0 | 1 | 85.8 | 0 | 0 | 82.7 |
| 200 | 1 | 2 | 95.7 | 0 | 1 | 85.8 | 0 | 0 | 81.8 |
| 225 | 1 | 2 | 95.3 | 0 | 1 | 82.5 | 0 | 0 | 71.2 |
| 250 | 1 | 2 | 94.8 | 0 | 0 | 83.8 | 0 | 0 | 85.5 |
| 300 | 1 | 2 | 93.7 | 0 | 0 | 96.3 | 0 | 0 | 74.8 |

TABLE 21

| | Control Cathogard 500, phosphate treated CRS panels | | | | | | | | |
|---|---|---|---|---|---|---|---|---|---|
| | @ 300° F. Bake | | | @ 325° F. Bake | | | @ 350° F. Bake | | |
| Voltage (volts) | MEK 25 rubs | MEK 50 rubs | Gloss | MEK 25 rubs | MEK 50 rubs | Gloss | MEK 25 rubs | MEK 50 rubs | Gloss |
| 150 | 5 | 5 | 92.3 | 4 | 5 | 98.0 | 0 | 1 | 83.4 |

Corrosion Test (Double Scab):

Bare CRS panels were coated with the urethane coating compositions of Examples 1A-1D to form urethane coatings of approximately 0.4 mil; three panels were coated for each example and at each temperature. These panels were cured at approximately 300° F., 325° F., and 350° F. for approximately 20 minutes.

After coating, each panel was scribed with a scab having the appearance of an "X." Initial adhesion and shot blast is omitted in the Corrosion Test. The daily test sequence and test cycle were carried out by placing the panels in test on any weekday between Tuesday through Friday. A total of 25 test cycles were carried out, with each cycle equaling one day. The cycle was first started by subjecting each panel to a 60 minute bake with an oven temperature of 60° C., followed by gradual cooling to room temperature for 30 minutes. The salt immersion and humidity portion of the test was done by first placing each panel in an aqueous solution of 5% (wt.) NaCl for 15 minutes followed by drying at ambient temperature for 75 minutes. This was performed once a week. After immersion, the panels were placed in a humidity cabinet (85% humidity) set at 60° C. for 22.5 hr. On weekends, the panels were allowed to remain in the humidity cabinet. After the 36 day, 25 cycles, the panels were removed from testing, thoroughly rinsed and scraped with a metal spatula to remove any loose paint. The average corrosion diameter was then obtained by using a caliper and taking random measurements along each side of the scab, this was done in three different panels all under the same conditions.

The results of the Corrosion Test are summarized in FIG. 1.

Example 2

Electrodepositable Acrylic Coating Composition Including Nonionic Metal Coordinating Structures Production of a Cationized Resin (Component A): (1) A flask equipped with a stirrer, thermometer, nitrogen inlet and reflux condenser is charged with 541 parts of butyl cellosolve and heated to 120° C. with stirring. While the temperature is maintained, a mixture of the following compounds is added dropwise over a period of 3 hours: styrene (484 parts); 2-allyloxytetrahydropyran (26 parts); 2-hydroxyethyl methacrylate (340 parts); n-butyl acrylate (114 parts); "FM-3" (113 parts) (FM-3 is a product of Daicel Chemical Industries, a hydroxyl-containing polymerizable unsaturated compound prepared by addition of ε-caprolactone to 2-hydroxyethyl methacrylate); acrylic acid (57 parts); and azoisobutyronitrile (68 parts).

After completion of the dropwise addition, the resulting mixture is maintained at the same temperature for 1 hour. A mixed solution of 11.3 parts of azoisobutyronitrile and 85 parts of butyl cellosolve is added dropwise over a period of 1 hour. The mixture is maintained at the same temperature for 1 hour, thus giving a carboxyl- and hydroxyl-containing acrylic polymer solution having a solids content of 63%. The polymer has an acid value of about 40 mg KOH/g, a hydroxyl value of about 140 mg KOH/g, and a number average molecular weight of about 13,000.

(2) Into a flask equipped with a stirrer, thermometer, nitrogen inlet and reflux condenser, 1,000 parts of 4,4'-diphenylmethane diisocyanate is placed and dissolved at 50° C. At the same temperature, 750 parts of diethylene glycol monoethyl ether is added and the reaction is allowed to proceed until the isocyanate content of the solids becomes 5.76%, thus giving a partially blocked isocyanate compound.

(3) A flask equipped with a stirrer, thermometer, nitrogen inlet and reflux condenser is charged with 272 parts of bisphenol A, 815 parts of a bisphenol A diglycidyl ether-type epoxy resin having an epoxy equivalent of 185, and 0.25 parts of tetraethylammonium bromide. The reaction is allowed to proceed at 150° C. until the epoxy equivalent of the reaction product becomes 570. After the reaction mixture is cooled to 120° C., 440 parts of the partially blocked isocyanate compound obtained in (2) is added and the reaction is allowed to proceed at 110° C. for 2 hours. Subsequently, 200 parts of butyl cellosolve, 650 parts of the above acrylic polymer solution having a solids content of 63% and 160 parts of diethanolamine are added. The reaction is allowed to proceed at 110° C. until no epoxy groups remain. The mixture is diluted with 375 parts of butyl cellosolve, giving a hydroxyl- and amino-containing acrylic resin solution having a solids content of 72%. The resin before introduction of cationic groups has an epoxy equivalent of about 700, a hydroxyl value of about 80 mg KOH/g, and a number average molecular weight of about 2,500.

Production of an Acrylic Resin (Component B): Butyl Cellosolve® (n-butoxyethanol) (184 parts) is heated to 130° C. and a mixture of the following compounds is added dropwise over a period of 3 hours: styrene (296 parts); 2-allyloxytetrahydropyran (16 parts); 2-hydroxyethyl methacrylate (216 parts); "FM-3" (192 parts); dimethylaminoethyl methacrylate (80 parts); and azoisobutyronitrile (40 parts).

The reaction mixture is aged at the same temperature for 1 hour, and then a mixed solution of 8 parts of azobisdimethylvaleronitrile and 56 parts of methyl isobutyl ketone is added dropwise at the same temperature over a period of 1 hour. The reaction mixture is further aged at the same temperature for 1 hour and diluted with butyl Cellosolve®, to produce a hydroxyl- and amino-containing acrylic resin solution with a solids content of 70%. The resin obtained has a number average molecular weight of about 15,000, a hydroxyl value of about 145 mg KOH/g and an amine value of about 36 mg KOH/g.

Production of an Isocyanate Crosslinking Agent (Component C): 268 parts of diethylene glycol monoethyl ether is added dropwise to 250 parts of 4,4'-diphenylmethane diisocyanate at 50° C., then the reaction is allowed to proceed at 80° C. until no free isocyanate groups remain. A completely blocked polyisocyanate compound is thereby obtained.

A cationic electrodeposition coating composition is prepared by mixing: cationized resin (Component A) (88 parts); acrylic resin (Component B) (12 parts); and isocyanate crosslinking agent (Component C) (7 parts). The mixture is neutralized with 0.3 equivalent of acetic acid and diluted with water to provide a cationic electrodeposition coating composition having a solids content of 20%.

The cationic electrodeposition coating composition is coated on zinc phosphate cold rolled steel panels at a bath temperature of 28° C. to form electrodeposition coating films having a thickness of about 20-25 μm when cured. The coating films are cured by heating at 160° for 10 minutes.

The description of the technology is merely exemplary in nature and, thus, variations that do not depart from the gist of the present disclosure are intended to be within the scope of the invention. Such variations are not to be regarded as a departure from the spirit and scope of the invention.

What is claimed is:

1. A method of producing a coating composition comprising:
    forming a film-forming material by reaction of a mixture comprising:
        a resin, wherein the resin has at least one group reactive with an electrophile, and
        an electrophilic ligand, wherein the electrophilic ligand has the formula: $X^5$—$R^5$—$X^6$ wherein, $X^5$ is an epoxide or halide monovalent radical; $R^5$ is an alkylene or arylene divalent radical having a molecular weight from about 90 g/mol to about 5000 g/mol and a nonionic metal coordinating structure comprising at least two electron-rich functional groups independently selected from the group consisting of oxygen, phosphorous, sulfur, silicon, unsaturated carbon, ester, ketone, ether and hydroxyl; and $X^6$ is a hydrogen, epoxide, or halide monovalent radical, wherein at least $X^5$ reacts to bond the nonionic metal coordinating structure to the resin via an ether linkage and wherein the reaction product comprises the formula:

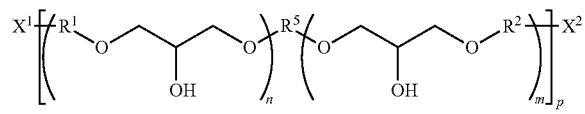

wherein,
    $X^1$ and $X^2$ are independently hydrogen, hydroxyl, epoxide, or amine functional monovalent radicals;
    each $R^1$ and $R^2$ is independently an alkylene or arylene divalent radical;
    n is a number from 1 to about 12;
    m is a number from 0 to about 12; and
    p is a number from 1 to about 12;
    and combining a crosslinker and the film-forming material.

2. A method of claim 1, wherein the resin is an epoxy resin.

3. A method of claim 1, wherein the at least one group reactive with an electrophile is a hydroxyl group.

4. A method of claim 1, wherein two of the electron rich functional groups are in an alpha or beta position relative to each other.

5. A method of claim 1, wherein the resin is bisphenol A.

6. A method of claim 1, wherein the mixture further includes a member selected from a group consisting of diglycidyl ether of bisphenol A, phenol, metals, metal compounds, and combinations thereof.

7. A method of claim 1, wherein the crosslinker is selected from a group consisting of blocked polyisocyanate compounds, uretdione compounds, polyisocyanates and oligomers thereof, and combinations thereof.

8. A method of claim 1, further comprising:
    forming a salting site on the film-forming material by reacting the film-forming material with an amine; incorporating quaternium ammonium, sulfonium, or phosphonium functionality on the film-forming material; or incorporating an acid functionality.

9. A method of claim 8, wherein the amine is selected from a group consisting of diethanolamine, methylethylanolamine, diketamine of diethylenetriamine, and combinations thereof.

10. A method of claim 1, wherein the combining step further includes a member of a group consisting of pigments, salting agents, metals, metal compounds, and combinations thereof.

11. A method of claim 10, wherein the combining step includes a metal or metal compound and the metal or metal compound is coordinated by the nonionic metal coordinating structure.

12. A method of claim 11, wherein the metal or metal compound is selected from a group consisting of M, MO, $M_2O_3$, $M(OH)_n$, $R_xMO$, and combinations thereof; wherein, M is a metal selected from the group consisting of Al, Bi, Ce, Cu, Fe, Pb, Sn, Sb, Ti, Y, Zn, and Zr; n is an integer satisfying the valency of M; R is an alkyl or aromatic group; and x is an integer from 1 to 6.

13. A method of claim 11, wherein the metal or metal compound comprises a metal catalyst selected from a group consisting of dibutyl tin oxide, dibutyl tin dilaurate, zinc oxide, bismuth oxide, tin oxide, yttrium oxide, copper oxide, and combinations thereof.

14. A method of producing a coated substrate comprising:
    preparing a coating composition comprising a crosslinker and a film-forming material, wherein the film-forming material comprises crosslinkable groups and the crosslinker comprises at least two functional groups reactive with the crosslinkable group, and the film-forming material further comprises a nonionic metal coordinating structure comprising at least two electron-rich functional groups independently selected from the group consisting of oxygen, phosphorous, sulfur, silicon, unsaturated carbon, ester, ketone, ether and hydroxyl, wherein the nonionic metal coordinating structure is bonded via an ether linkage, and wherein the film-forming material comprises the formula:

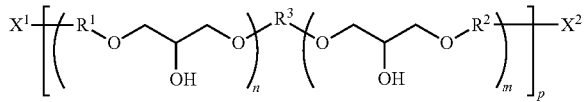

wherein,
    $X^1$ and $X^2$ are independently hydrogen, hydroxyl, epoxide, or amine functional monovalent radicals;
    each $R^1$ and $R^2$ is independently an alkylene or arylene divalent radical;
    $R^3$ is an alkylene or arylene divalent radical comprising the nonionic metal coordinating structure;
    n is a number from 1 to about 12;
    m is a number from 0 to about 12; and
    p is a number from 1 to about 12; and
    applying the coating composition to the substrate.

15. A method of claim 14, wherein the film-forming material is an epoxy resin.

16. A method of claim 14, wherein two of the electron-rich functional groups are in an alpha or beta position relative to each other.

17. A method of claim 14, wherein the preparing step further includes a member of a group consisting of pigments, salting agents, metals, metal compounds, water, and combinations thereof.

18. A method of claim 17, wherein the preparing step includes a metal or metal compound and the metal or metal compound is coordinated by the nonionic metal coordinating structure.

19. A method of claim 18, wherein the metal or metal compound is selected from a group consisting of M, MO, $M_2O_3$, $M(OH)_n$, $R_xMO$, and combinations thereof; wherein, M is a metal selected from the group consisting of Al, Bi, Ce, Cu, Fe, Pb, Sn, Sb, Ti, Y, Zn, and Zr; n is an integer satisfying the valency of M; R is an alkyl or aromatic group; and x is an integer from 1 to 6.

20. A method of claim 18, wherein the metal or metal compound comprises a metal catalyst selected from a group consisting of dibutyl tin oxide, dibutyl tin dilaurate, zinc oxide, bismuth oxide, tin oxide, yttrium oxide, copper oxide, and combinations thereof.

21. A method of claim 14, further comprising:
curing the applied coating composition.

22. A method of claim 14, further comprising:
forming a salting site on the film-forming material by reacting the film-forming material with an amine; incorporating quaternium ammonium, sulfonium, or phosphonium functionality on the film-forming material; or incorporating an acid functionality prior to the applying step.

23. A method of claim 14, further comprising:
mixing the coating composition to form a dispersion; and
wherein the applying step includes electrodepositing the coating composition to the substrate, wherein the substrate is a metal substrate.

24. A method of claim 14, wherein the film-forming material is formed using reaction (I) or reaction (II), wherein, reaction (I) comprises reacting together:
a resin, wherein the resin has at least one group reactive with a nucleophile, and
a nucleophilic ligand, wherein the nucleophilic ligand has the formula: $X^3-R^4-X^4$ wherein, $X^3$ is a hydroxyl or carboxyl monovalent radical; $R^4$ is an alkylene or arylene divalent radical having a molecular weight from about 90 g/mol to about 5000 g/mol and the nonionic metal coordinating structure; and $X^4$ is a hydrogen, hydroxyl, or carboxyl monovalent radical; and reaction (II) comprises reacting together:
a resin, wherein the resin has at least one group reactive with an electrophile, and
an electrophilic ligand, wherein the electrophilic ligand has the formula: $X^5-R^5-X^6$ wherein, $X^5$ is an epoxide or halide monovalent radical; $R^5$ is an alkylene or arylene divalent radical having a molecular weight from about 90 g/mol to about 5000 g/mol and the nonionic metal coordinating structure; and $X^6$ is a hydrogen, epoxide, or halide monovalent radical.

25. A method of claim 14, wherein the substrate is an electrically conductive substrate.

* * * * *